United States Patent [19]
Westerlund

[11] Patent Number: 5,324,497
[45] Date of Patent: Jun. 28, 1994

[54] INTEGRATED PROCEDURE FOR HIGH YIELD PRODUCTION OF CHLORINE DIOXIDE AND APPARATUS USED THEREFOR

[76] Inventor: G. Oscar Westerlund, 5041 Cypress Street, Vancouver, B.C., Canada, V6P 3P9

[21] Appl. No.: 843,945

[22] Filed: Feb. 26, 1992

[51] Int. Cl.⁵ .......................... C01B 11/02; C25B 1/26
[52] U.S. Cl. ................................... 423/478; 423/487; 204/95; 204/277; 204/278; 422/189; 422/198; 422/211; 422/218; 422/234; 422/307
[58] Field of Search ............... 204/295, 275, 278, 277; 423/478, 487; 422/189, 198, 211, 215, 234, 307

[56] References Cited

U.S. PATENT DOCUMENTS

| | | | |
|---|---|---|---|
| 2,484,402 | 10/1949 | Day et al. | 23/152 |
| 2,731,325 | 1/1956 | Kesting | 23/152 |
| 2,833,624 | 5/1958 | Sprauer | 23/152 |
| 2,861,871 | 11/1958 | Germano | 23/152 |
| 2,863,722 | 12/1958 | Rapson | 23/152 |
| 2,871,097 | 1/1959 | Rapson | 23/152 |
| 2,936,219 | 5/1960 | Rapson | 23/152 |
| 3,347,628 | 10/1967 | Sepall | 23/121 |
| 3,404,952 | 10/1968 | Westerlund | 23/152 |
| 3,516,790 | 6/1970 | Westerlund | 23/152 |
| 3,524,728 | 8/1970 | Westerlund | 23/262 |
| 3,594,580 | 7/1971 | Westerlund | 252/187 |
| 3,607,027 | 9/1971 | Westerlund | 23/152 |
| 3,793,439 | 2/1974 | Rapson | 423/478 |
| 3,920,801 | 11/1975 | Grotheer | 423/477 |
| 3,925,540 | 12/1975 | Hatherly | 423/478 |
| 3,929,974 | 12/1975 | Winfield | 423/478 |
| 4,069,117 | 1/1978 | Cooper | 204/98 |
| 4,075,308 | 2/1978 | Rapson et al. | 423/478 |
| 4,086,329 | 4/1978 | Cowley et al. | 423/478 |
| 4,137,296 | 1/1979 | Glew et al. | 423/478 |
| 4,176,168 | 11/1979 | Goto | 423/478 |
| 4,216,195 | 8/1980 | Jaszka et al. | 423/478 |
| 4,294,815 | 10/1981 | Lohrberg et al. | 423/478 |
| 4,372,939 | 2/1983 | Bielz et al. | 423/478 |
| 4,393,035 | 7/1983 | Fredette | 423/478 |
| 4,534,952 | 8/1985 | Rapson et al. | 423/478 |
| 4,543,243 | 1/1985 | Fröhler et al. | 423/478 |

FOREIGN PATENT DOCUMENTS

| | | | |
|---|---|---|---|
| 461586 | 12/1949 | Canada | |
| 535200 | 1/1957 | Canada | |
| 554816 | 3/1958 | Canada | |
| 782574 | 4/1968 | Canada | |
| 808556 | 3/1969 | Canada | |
| 0809143 | 3/1969 | Canada | 423/478 |

(List continued on next page.)

Primary Examiner—Kathryn Gorgos
Attorney, Agent, or Firm—Louis Weinstein

[57] ABSTRACT

A novel continuous process and system are provided for the production of chlorine dioxide at favorable economics and high efficiency. The process involves effecting electrolysis of an aqueous solution of alkali metal chloride, in an electrolysis zone, to form an aqueous solution of alkali metal chlorate having a chlorate ion concentration of about 400 to about 1,200 g/L, and a chloride ion concentration of about 90 to about 120 g/L, gaseous hydrogen and water vapor. Hydrogen is conducted to a hydrogen chloride synthesis system where it reacts with chlorine gas, (recycled, as well as make-up,) to yield hydrogen chloride gas which is quenched with water to provide hydrochloric acid. A solution of alkali metal chlorate is conducted from the electrolysis zone to the chlorine dioxide generating zone. The chemical reaction is between an all scale metal chlorate concentration of about 400 to about 1,200 g/L and an alkali metal chloride concentration of about 90 to about 120 g/L and over about 90 g/L chloride ion concentration. The reaction is driven by the high chlorate and chloride ion concentrations, high reacting temperature and with the hydrochloric acid injected through multi-capillary tubes at high velocity. The reaction provides chlorine dioxide gas with some by-product chlorine, which is at least in part separated by an auxiliary chlorine dioxide absorbing in-loop system. The unreacted chlorate/chloride solution from the chlorine dioxide generator is recycled to the electrolysis zone. The alkali metal is sodium or lithium at the very high chlorate ion concentrations. The method includes methods for recovering chlorine as gas or an equivalent chloride for recycling within the process system.

99 Claims, 4 Drawing Sheets

FOREIGN PATENT DOCUMENTS 922661 3/1973 Canada .
956783 10/1974 Canada .
1053604 5/1979 Canada .
1074726 4/1980 Canada .
1088274 10/1980 Canada .
1105877 7/1981 Canada .
1184148 3/1985 Canada .
1195477 10/1985 Canada .
1212076 9/1986 Canada .
1223715 7/1987 Canada .

INTEGRATED PROCEDURE FOR HIGH YIELD PRODUCTION OF CHLORINE DIOXIDE AND APPARATUS USED THEREFOR

BACKGROUND OF THE INVENTION

(i) Field of the Invention

This invention relates to the production of chlorine dioxide, and more particularly to an improved integrated process for producing chlorine dioxide continuously, efficiently and rapidly with high yields and with a minimum requirement for many initial reactions.

(ii) Description of the Prior Art

Chlorine dioxide has been industrially employed as a bleaching agent by the cellulose pulp industry for over half a century. The industrial production of chlorine dioxide has grown substantially over the years. The present world production capacity approaches one-million tons annually.

The demand for chlorine dioxide is projected for significant growth in the next decade because most pulp mills are committed towards substitution of chlorine through the use of chlorine dioxide. This substitution is a result of new regulations worldwide limiting the pulp mills effluent of Total Organic Chlorides. In addition, the delignification and bleaching of pulp should be carried out without the production of chloroform, furans and dioxins.

This substitution of chlorine by chlorine dioxide represents an increased cost to pulp mills due to the higher cost of an equivalent amount of chlorine dioxide. Furthermore, the conventional chlorine dioxide plants yield, as by-products, spent acid, salt cake and sodium chlorate. This acid solution, and/or slurry (if the salt cake is crystallized) is undesirable to pulp mills because, when fed to the chemical recovery system, it can be the cause of production down time and maintenance costs associated with the boiler tubes.

One of the more traditional procedures for the production of chlorine dioxide is the reaction of hydrochloric acid and chloric acid to produce gaseous mixtures of chlorine dioxide and chlorine. In practice, these reactions were carried out by treating aqueous mixtures of water-soluble chlorates and chlorides, such as may be obtained, for example, by chlorinating lime or by the electrolysis of salt, with an excess of a strong acid, for example, hydrochloric acid or sulfuric acid. The reactions above referred to may be represented by the following equations:

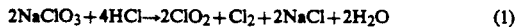

$$2NaClO_3 + 4HCl \rightarrow 2ClO_2 + Cl_2 + 2NaCl + 2H_2O \quad (1)$$

$$2NaClO_3 + 12HCl \rightarrow 6Cl_2 + 2NaCl + 6H_2O \quad (2)$$

Ordinarily, reaction (2) is predominant over reaction (1), and consequently, the yield in chlorine dioxide is correspondingly low.

To minimize reaction (2) it has been suggested to react properly proportioned mixtures of chlorates, chlorides and a strong inorganic acid in dilute solutions (containing at least 50% and preferably up to 75% of water) at temperatures below 60° C. Based on reaction (1), equivalent ratios of $Cl/ClO_3 = 2$ and of $H^+/ClO_3 = 2$ should give high yields of $ClO_2$ per mole of chlorate decomposed. In practice, however, it has been proposed in particular to use a ratio of $H^+/ClO_3-$ in excess of 2 because reaction (2) uses some of the chlorate in producing chlorine instead of $ClO_2$. This proposal results in the use of excessive quantities of reactants.

Since chlorine dioxide is explosive at high temperatures, the reactions described hereinabove have generally been carried out at relatively low temperatures. Furthermore, in order to reduce still further the danger of explosion, a non-reactive (inert) gas was conducted into the reaction vessel. The purpose of the gas was to reduce the concentration of chlorine dioxide in the vessel to a nonexplosive proportion.

In processes where gaseous hydrogen chloride was used or where large amounts of inert gases were used, there was a need for a rather large compressor. The need for such compressor involved increased capital and operating costs.

Of the many patents directed to the preparation of chlorine dioxide by introducing an aqueous solution of sodium chlorate and sodium chloride and an acidic agent into a reaction vessel in a continuous manner, mention be made of the following:

Canadian Patent 461,586 patented Dec. 6, 1949 by G.A. Day provided a process for the manufacture of chlorine dioxide, by supplying an aqueous solution of an inorganic chlorate to the reaction chamber, and gaseous hydrogen chloride, the hydrogen chloride being supplied to the chamber in amount insufficient to react with all the chlorate present therein. The resulting acid was reacted with the chlorate. Gaseous chlorine dioxide and chlorine were removed from the reaction chamber. Partially reacted chlorate solution from the reaction chamber was passed to an electrolytic chlorate cell to increase the chlorate content thereof. The fortified chlorate solution was returned to the reaction chamber for further reaction with hydrogen chloride. The patentee provided for the use of electrolytic chlorate liquor containing about 500 g/L sodium chlorate and about 75 g/L sodium chloride. The low amount of chloride in the electrolytic chlorate liquor did not always serve to prevent the precipitation of chloride during the reaction to form the chlorine dioxide. Such precipitation of chloride reduced the efficiency of the chlorine dioxide generator.

Canadian Patent 560,447 patented Jul. 15, 1958 by A. Germano provided a process for manufacturing of chlorine dioxide from sodium chlorate and hydrochloric acid by reacting more than two molecules of hydrochloric acid per molecule of sodium chlorate, at a temperature sufficiently low, preferably below about $+10°$ C., in such a manner as to precipitate the sodium chloride which was separated, as to desorb the chlorine dioxide and the chlorine from the solution thus obtained by the action of an inert gas and/or heat, and to re-use the residual solution for preparing the solution of chlorate for further reaction. The patentee further taught that, as a first step, a solution of sodium chlorate, preferably saturated in chlorate, and obtained by the addition of chlorate to a residue solution coming from a previous manufacture, was introduced into a reactor. The low amount of chloride in the electrolytic chlorate liquor did not always serve to prevent the precipitation of chloride during the reaction to form the chlorine dioxide. Such precipitation of chloride reduced the efficiency of the chlorine dioxide generator.

Canadian Patent 728,075 patented Feb. 5, 1966 by H.C. Scribner provided a process for the production of chlorine dioxide by reacting an aqueous solution of an alkali metal chlorate with hydrochloric acid in a reaction zone to produce chlorine dioxide and an alkali metal chloride. There was at least a portion of the solution in the reaction zone passed to an enriching zone, to provide, in the enriching zone, alkali metal chlorate in an amount in excess of the amount of chlorate required to saturate the solution with respect to the alkali metal chloride. This provided conditions favourable to the precipitation of alkali metal chloride in the enriching zone. The chlorate content of the solution was increased and the alkali metal chloride was then precipitated in the enriching zone by passing the solution through the enriching zone. The enriched solution was conducted from the enriching zone to the reaction zone for reaction with hydrochloric acid to generate chlorine dioxide. Typically, the concentration of sodium chlorate was from about 447 to about 514 g/L, the concentration of sodium chloride was from about 151 to about 202 g/L, and the concentration of hydrochloric acid was from about 17 to about 21.5 g/L.

Canadian Patent 1,076,321 patented Apr. 29, 1980 by Isao Isa et al provided a process for manufacturing chlorine dioxide by reducing a chlorate (e.g. sodium chlorate, potassium chlorate, calcium chlorate or magnesium chlorate, ) in hydrochloric acid in a concentration of from about 0.01 to about 4 moles per liter of reaction medium, in the presence of a specified complex catalyst. The concentration of the chlorate taught was from about 0.01 molar (about 10.7 g/L sodium chlorate) to about 5 molar (about 533 g/L sodium chlorate) of the reaction medium.

Canadian Patent 951,085 patented Jul. 16, 1974 by W.H. Rapson provided a process for the production of chlorine dioxide which comprised forming chlorine dioxide by reducing an alkali metal chlorate in a first acid aqueous reaction medium in a first reaction zone at a first elevated temperature below the temperature above which substantial decomposition of chlorine dioxide would occur, and simultaneously evaporating water from the first medium, thereby to form a gaseous mixture comprising steam and chlorine dioxide. The gaseous mixture was removed from the first reaction zone. Chlorine dioxide was produced by reducing an alkali metal chlorate in a second acid aqueous reaction medium in a second reaction zone physically separate from the first reaction zone at a second elevated temperature lower than the first elevated temperature. The removed gaseous mixture was passed into heat exchange relationship with the second reaction medium to provide at least part of the heat required to maintain the second elevated temperature. The chlorine dioxide formed in the first and second reaction zones was then recovered. The concentration of chlorate and chloride in the reaction medium may vary over a wide range. For example, the concentration of chlorate in the reacting solution could be in the range of about 0.005 molar (about 0.5 g/L) to about 3 molar, (about 320 g/L) and the concentration of the chloride may be in the range of about 0.001 molar (about 0.06 g/L) to about 2 molar (about 117 g/L). Consistent with such ranges, moreover, it was taught that it was preferred to utilize an approximately equimolar ratio in order to maximize the production of chlorine dioxide with equation 1 above. Ratios of chloride: chlorate generally varied between about 1:1 and about 3:1, preferably about 1.1:1 to about 1.3:1. The low amount of chloride in the electrolytic chlorate liquor did not always serve to prevent the precipitation of chloride during the reaction to form the chlorine dioxide. Such precipitation of chloride reduced the efficiency of the chlorine dioxide generator.

Canadian Patent 1,088,274 patented Oct. 28, 1980 by Alain Caillol provided an improvement in the conventional processes generating chlorine dioxide in sulfuric acid employing sulfur dioxide or methanol as reducing agent. The chlorine dioxide produced from the gaseous effluent issuing from the production reactor was separated by absorption by means of cooled water in a packed column. The gaseous effluent (tail gas) issuing from the absorption column was recycled to the production reactor, in order to dilute the chlorine dioxide produced. The improvement involved the method of reacting sulfur dioxide with chlorine in the presence of water to yield hydrochloric acid and sulfuric acid, thus, reducing chlorine to nothing, with no accumulation of chlorine in the recycled tail gases. The economy in respect of chlorate would be better still if a certain amount of chloride (not exceeding about 16% of the chlorate, preferably about 6% of the chlorate) was introduced with the chlorate solution into tile main reactor.

U.S. Pat. No. 4,137,296 patented Jan. 30, 1979 by D.N. Glew et al provided a process of producing chlorine dioxide from an alkali metal chlorate by reacting the chlorate with hydrogen chloride by maintaining, in a reaction vessel, an aqueous reaction medium containing at least about 5.5 molar (about 586 g/L) of sodium chlorate, sufficient hydrogen chloride to provide an acid normality of at least about 0.002 and sufficient sodium chloride to saturate the reaction medium. The reaction medium was boiled at a temperature of up to about 100° C. A mixture including chlorine dioxide gas, chlorine gas and water vapor was withdrawn from the reaction vessel. The patentee taught the feeding of a sufficient amount of an aqueous solution containing sodium chlorate into the reaction zone to provide the desired reaction medium. A sufficient amount of hydrogen chloride into the reaction zone to provide a reaction medium acidity of from about 0.002 to about 6 normal. The reaction medium was maintained at boiling by maintaining the temperature within the range of from about 40° to about 100° C. and the pressure within tile vessel within the range of from about 40 to about 500 millimetres of mercury absolute. A slurry containing a portion of the reaction medium and solid sodium chlorate particles was withdrawn from the reaction zone. Solid sodium chloride was removed from the withdrawn slurry to provide a slurry effluent. The effluent was returned to the reaction zone. Hydrogen chloride was added to the withdrawn slurry. An inert diluent gas was fed into a gas zone superimposing the reaction zone. The gaseous chlorine was withdrawn from the chlorine dioxide reaction product. The low amount of chloride in the electrolytic chlorate liquor did not always serve to prevent the precipitation of chloride during the reaction for form the chlorine dioxide. Such precipitation of chloride reduced the efficiency of the chlorine dioxide generator.

U.S. Pat. No. 4,045,542 patented Aug. 30, 1977 by W.A. Fuller provided an improvement in a process for continuously generating a mixture containing chlorine dioxide, chlorine and an alkali metal salt, wherein an alkali metal chlorate and hydrochloric acid were continuously reacted in suitable proportions to generate chlorine dioxide and chlorine with the temperature being maintained at from about 50° to about 100° C. The acidity of the reaction solution was maintained within the range of about 0.05 to about 2.5 normal. Chlorine dioxide and chlorine produced by the reaction was withdrawn from the reactor, and water was removed and alkali metal salt of the hydrochloric acid was crystallized in the form of an aqueous slurry containing minor amounts of chlorate, and acid values. The improvement involved continuously passing the slurry containing alkali metal salt crystals into the top of a separatory column, in a downward flow. A stream of water was countercurrently and continuously passed upwardly through the column at a rate sufficient to effect washing of the downwardly flowing crystals whereby chlorate, chloride and acid values recovered therefrom were continuously and substantially completely returned to the reaction. An aqueous slurry of substantially pure alkali metal chloride salt crystals was continuously removed from the bottom of the separatory column. The patentee further taught that the concentration of alkali metal chlorate was preferably maintained on the high side of the applicable concentration range of about 0.2 molar (about 21 g/L) to about 5 molar (about 533 g/L). This was especially true during operation in the region from approximately 75° C. to 90° C. and at pressures in the region of 400 millimetres mercury absolute. The low amount of chloride in the electrolytic chlorate liquor did not always serve to prevent the precipitation of chloride during the reaction for form the chlorine dioxide. Such precipitation of chloride reduced the efficiency of the chlorine dioxide generator.

Improvements were also provided in the inventions described in the above identified patents by providing a continuous process for the production of chlorine dioxide involving the recycling and reuse of by-products and incompletely-reacted reagents. Among such patents are:

Canadian Patent 782,574 patented Apr. 9, 1968 by G.O. Westerlund, which provided an improved continuous recyclic process and apparatus for the production of chlorine dioxide. That patented process involved the first steps of effecting electrolysis of an aqueous solution of a metal chloride to form an aqueous solution of a metal chlorate and gaseous hydrogen. The gaseous hydrogen was reacted with gaseous chlorine to form gaseous hydrogen chloride. The aqueous solution of metal chlorate was reacted with the gaseous hydrogen chloride to form an aqueous solution of metal chloride, which was recycled to the first step and an aqueous solution of chloric acid. The aqueous solution of chloric acid was reacted with the gaseous hydrogen chloride to form chlorine dioxide, which was recovered, water and gaseous chlorine, which was recycled to the second step.

That patented process for the manufacture of chlorine dioxide which was based on the following main reactions: (M=metal ion)

(1) $2MCl + 6H_2O + 12\ FARADAYS \longrightarrow 2MClO_3 + 6H_2$ (2) $2H_2 + 2Cl_2 \longrightarrow 4HCl$ (3) $2MClO_3 + 2HCl \longrightarrow 2MCl + 2HClO_3$ (4) $2HClO_3 + 2HCl \longrightarrow 2ClO_2 + Cl_2 + 2H_2O$ The system was balanced as follows:

(5) $4H_2O + Cl_2 + 12\ FARADAYS \longrightarrow 2ClO_2 + 4H_2$

FEED             DISCHARGE

The action of hydrogen chloride on the metal chlorate solution produced chlorine dioxide and chlorine according to reactions (3) and (4). By controlling the acidity and by utilizing an excess of the metal chlorate, reactions (3) and (4) can be caused to yield $ClO_2:Cl_2$ in a ratio of 2:1. Chlorine was consumed in reaction (2) for production of hydrogen chloride. Thus the system theoretically yielded chlorine dioxide only, free of chlorine to the extent of the efficiency of chlorine dioxide gas separator. Since the system was closed, after the initial charge of metallic chloride, no addition of salt was required. Furthermore, the electrolysis in reaction (1) produced three times the required amount of hydrogen. The process of that invention was thus based on a system which required water, chlorine and electric current for the production of chlorine dioxide.

The system of that invention was a useful improvement over the previous systems, being a closed system with essentially no major effluent liquor other than the output of chlorine dioxide solution. Therefore, losses of reagents were minimized and the manufacturing cost of chlorine dioxide was determined by the cost of power and chlorine. The system in that invention was self-regenerating in regard to chemicals except for chlorine and water. At 100% yield, one mole of chlorine was required for the production of two moles of chlorine dioxide. The only other raw material was electrical energy, the two moles of water per mole of $ClO_2$ being insignificant.

Other improvements were provided by the following patents:

Canadian Patent 808,556 patented March 18, 1969 by G.O. Westerlund provided an improvement in the chlorine dioxide preparation process of Canadian patent 782,574 by the steps of reacting the inorganic chlorate with an aqueous hydrochloric acid solution whereby chlorine dioxide gas and chlorine gas were formed. Chlorine gas was separated from chlorine dioxide. A portion of the chlorine gas was reacted with hydrogen gas to form hydrogen chloride. Hydrogen chloride was dissolved in water to form an aqueous solution of hydrochloric acid. The aqueous hydrochloric acid produced was then used as one of the reactants.

Canadian Patent 809,556 patented Mar. 25, 1969 by G.O. Westerlund provided another improvement in the chlorine dioxide preparation process of Canadian Patent 782,574 by the step of reacting the inorganic chlorate with an aqueous solution of hydrochloric acid. The gaseous products of reaction comprising chlorine and chlorine dioxide were swept from a gas zone atop the liquor zone with a diluent gas admitted to the reaction zone near the interface between the gas zone and the liquor zone.

Canadian Patent 828,061 patented Nov. 25, 1969 by G.O. Westerlund provided still another improvement in the chlorine dioxide production process of Canadian Patent 782,574 by the step of diluting hydrogen chloride gas with chlorine or a mixture of chlorine, carbon dioxide and water vapor. The aqueous solution of chlorate was reacted with the diluted hydrogen chloride gas. A final reaction product comprising about 10% or less chlorine dioxide gas diluted with about 90% or more chlorine gas, or about 10% or less chlorine dioxide gas diluted with about 90% or more of a mixture of chlorine gas, carbon dioxide gas and water vapour was then recovered.

Canadian Patent No. 922,661 patented Mar. 13, 1973 by G.O. Westerlund provided an integrated process for the continuous, high yield production of chlorine dioxide. The process included the step of effecting an electrolysis reaction in an electrolysis zone to form a gaseous product comprising predominantly hydrogen, as well as water, oxygen and chlorine, and a liquid product comprising an aqueous solution of a chlorate, a chloride and a dichromate. Both liquid product and gaseous effluent were withdrawn from the electrolysis zone. The withdrawn electrolysis products was passed to a reaction zone where the liquid produced, comprising an aqueous solution of a chlorate and a chloride, was converted to a product comprising an optimum proportion of chlorate therein. Gaseous product comprising hydrogen and well as steam, oxygen, and chlorine substantially-free of the liquid product was withdrawn from the reaction zone. The withdrawn liquid product was then passed to a two-stage chlorine dioxide generation zone, each stage being maintained within different temperature ranges where the chlorate liquor was reacted with aqueous hydrochloric acid reducing agent in the presence of a sweeping current of air and a portion of the gaseous product. Liquid product was withdrawn from the second stage of the chlorine dioxide generation zone and such withdrawn product was passed to an evaporation zone where a controlled portion of the water therein was evaporated to provide hot water for heat use, and from where weak chlorate liquor was withdrawn for recycling to the electrolysis zone. Gaseous effluent containing liquid product was withdrawn from the second stage of the chlorine dioxide generation zone, and the contained liquid was separated therefrom. Such liquid was conducted to the evaporation zone. The gaseous effluent was passed countercurrently in contact with an aqueous solvent in a chlorine dioxide adsorption zone. Liquid effluent comprising an aqueous acidic solution of chlorine dioxide was withdrawn from the chlorine absorption zone and such effluent was stored in a chlorine dioxide solution storage zone. Gaseous effluent was withdrawn from the chlorine dioxide absorption zone.

U.S. Pat. No. 3,607,027 patented Sep. 21, 1971 by G.O. Westerlund provided an improved process for preparing chlorine dioxide wherein the bulk of the reactants were internally produced. The reactants included an aqueous solution of an inorganic chlorate and an aqueous hydrochloric acid. The aqueous solution of the inorganic chlorate was produced by electrolyzing an aqueous solution of an inorganic chloride. The aqueous hydrochloric acid was produced from hydrogen gas, which was a by-product of the electrolysis reaction by which the inorganic chloride was converted to the inorganic chlorate, and chlorine gas. In reacting the aqueous inorganic chlorate with the aqueous hydrochloric acid, both gaseous chlorine dioxide and gaseous chlorine were formed. The gaseous chlorine was separated from the gaseous chlorine dioxide. A portion of the so-separated gaseous chlorine was reacted with the hydrogen to form gaseous hydrogen chloride. The gaseous hydrogen chloride was used as a reactant, either by dissolving it in a stoichiometrically insufficient quantity of water, thereby to provide an aqueous solution of hydrochloric acid and free hydrogen chloride gas, or by dissolving it in water containing absorbed chlorine gas.

U.S. Pat. No. 3,929,974 patented Dec. 30, 1975 by J.D. Winfield provided a process for the production of chlorine dioxide by continuously feeding an aqueous solution of an alkali metal chlorate and hydrochloric acid to a reaction zone to maintain an aqueous reaction medium in the reaction zone containing an alkali metal chlorate and hydrochloric acid and having an acidity of about 0.05 to about 1N. Chlorine dioxide and chlorine were continuously formed by reaction between the alkali metal chlorate and the hydrochloric acid in the reaction medium. The reaction zone was continuously maintained under a reduced pressure. The reaction medium was continuously maintained at its boiling point to evaporate water from the reaction medium continuously to form a gaseous phase in the reaction zone consisting of a mixture of chlorine dioxide, chlorine and water vapor, and to deposit alkali metal chloride in the reaction zone. The gaseous phase mixture was continuously conducted out of the reaction zone. Chlorine dioxide was continuously recovered from the mixture. Deposited alkali metal chloride was removed from the reaction zone. An aqueous solution was formed from the removed alkali metal chloride. That aqueous solution was continuously electrolyzed to convert the alkali metal chloride at least partially to alkali metal chlorate and to generate hydrogen gas. There was at least the alkali metal chlorate content of the alkali metal chlorate-containing solution continuously fed to the reaction zone. There was at least part of the hydrogen gas continuously reacted with chlorine gas to generate hydrogen chloride. Hydrochloric acid was continuously formed from the hydrogen chloride. There was at least part of that continuously fed hydrochloric acid to the reaction zone. The patentee further taught that the concentration of sodium chlorate could be about 250 g/L and that the concentration of sodium chloride was about 150 g/L. The low amount of chlorate in the electrolytic chlorate liquor did not allow for the optimum concentration to optimize the production of chlorine dioxide. High concentrations of chlorate tended to increase the efficiency of the production of chlorine dioxide.

SUMMARY OF THE INVENTION

Aims of the Invention

It has been recognized that a high yield of chlorine dioxide per mol of chlorate decomposed, while desirable, was not alone sufficient to make the process economical for large scale production of chlorine dioxide. As a matter of practical necessity, it has, therefore, been recommended that the decomposition of the chlorate initially present be carried out substantially to completion to avoid any appreciable waste of this valuable raw material. However, the requirement of consuming all, or almost all, of the chlorate entailed inherent difficulties which greatly decreased the efficiency and rapidity and therefore the economy of the process. One difficulty was the fact that the average hourly output of $ClO_2$ per reaction volume was necessarily low because the reaction rate decreased considerably as the concentration of the reactants, particularly of chlorate, decreased. The use of solutions of low chlorate content further magnified this effect and wasted valuable space in the reaction chamber. Finally, as the concentration of chlorate decreased, reaction (2) (disclosed above) contributed increasingly to the decomposition of the chlorate, whereby the overall yield of chlorine dioxide was lowered.

In spite of the above-identified patented improvements in the integrated chlorine dioxide production process, there is still a need for a process which does not yield any by-product, so as to provide for improved economics in the manufacture of the chlorine dioxide.

One object of this invention is to improve manufacturing economics by providing higher chlorine dioxide efficiency.

Another object of this invention is to prove an integrated process which produces chlorine dioxide economically at a higher efficiency with production of a high ratio of chlorine dioxide to chlorine ratio.

Yet another object of this invention is to provide high chlorate ion concentration to be used as the driving force for chlorate dioxide generation as well as providing for lower acid residual and on/off generation with acid feed as control.

Still another object of this invention is to provide a high rate of chlorate electrolyte recirculation to be used to provide heat values available from electrolysis.

A further object of this invention is to provide flash evaporation to be used for water balance while utilizing low absolute pressure of the chlorine compressor.

Yet, a further object of this invention is to provide improved hydrochloric acid inter-mix with chlorine dioxide generator liquid for improved generating efficiency and to facilitate operating at a higher temperature in the reacting zone.

A still further object of this invention is to provide the use of a hydrochloric acid synthesis system with water quenching for temperature control and, thus, to enable the use of standard acid fire resistant brick construction in the hydrochloric acid combustion chamber and ceramic/plastic construction for the absorber.

Still another object of this invention is to provide for the destruction of chlorine by methanol addition to the reactants of the chlorine dioxide generator.

A still further object of this invention is to provide a chlorine separating system employing weak hydrogen chloride water solution for suppressing the solubility of chlorine.

Yet another object of this invention is to provide a limited air stripping (limited to less than about 10% chlorine dioxide stripped) system, for lowering chlorine in the product, stripped gases recovered are sent to an elevated point on the chlorine dioxide absorbing tower or, used for dilution of gases in the chlorine dioxide generated by recycling the gases to the chlorine dioxide generator.

Statement of Invention

The present invention provides a continuous process for the production of chlorine dioxide which comprises: effecting electrolysis of an aqueous solution of alkali metal chloride, in an electrolysis zone, having a sufficient concentration so as to form an aqueous solution of alkali metal chlorate having a chlorate ion concentration of over about 400 g/L, a chloride ion concentration of over about 90 g/L, gaseous hydrogen and water vapor; conducting the produced gaseous hydrogen and the water vapor to a hydrogen chloride generation zone where it is reacted with chlorine gas (recycled and make-up chlorine respectively), and withdrawing an aqueous solution of hydrochloric acid therefrom; withdrawing aqueous solution of the alkali metal chlorate and alkali metal chloride at an alkali metal chlorate concentration of over about 400 g/L, and at an alkali metal chloride concentration of over about 90 g/L from the electrolysis zone, and conducting that withdrawn solution and aqueous solution of hydrochloric acid from the hydrogen chloride generation zone to a chlorine dioxide generation zone where reaction takes place to produce chlorine dioxide and chlorine; withdrawing a mixture of chlorine dioxide and by-product chlorine therefrom and recovering product chlorine dioxide from that mixture; recycling by-product gaseous chlorine withdrawn from the chlorine dioxide synthesis zone to the hydrogen chloride generation zone for reaction with hydrogen gas and water to form hydrochloric acid; and recycling unreacted aqueous solution of alkali metal chlorate from the chlorine dioxide generation zone to the electrolysis zone.

The invention also provides a continuous recycle, substantially- closed-loop method for producing chlorine dioxide which method comprises: electrolyzing an aqueous solution of alkali metal salts in an electrolyzing zone, the alkali metal salts being of a sufficient concentration as to form an aqueous solution containing over about 400 g/L of an alkali metal chlorate and over about 90 g/L unreacted alkali metal chlorides, and gaseous hydrogen; conveying the gaseous hydrogen to a hydrogen chloride combustion zone, where hydrogen gas is reacted with chlorine gas to form hydrogen chloride, and where the hydrogen chloride is reacted with water to form an aqueous solution of hydrochloric acid; conveying the aqueous solution of hydrochloric acid from the hydrogen chloride combustion zone and the aqueous solution containing over about 400 g/L of an alkali metal chlorate and over about 90 g/L of an alkali metal chloride from the electrolysis zone to a chlorine dioxide synthesis zone, where the alkali metal chlorate and hydrochloric acid are reacted to generate chlorine dioxide and chlorine in accordance with the equation:

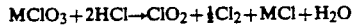

$$MClO_3 + 2HCl \rightarrow ClO_2 + \tfrac{1}{2}Cl_2 + MCl + H_2O$$

where M is an alkali metal; separating gaseous chlorine from gaseous chlorine dioxide; recovering the chlorine dioxide by dissolving the chlorine dioxide in water or in weak chilled hydrochloric acid; recycling the separated chlorine gas to the hydrogen chloride combustion zone in a chlorine separating zone; recycling spent aqueous solution containing alkali metal chlorate and alkali metal chloride to the electrolysis zone; and withdrawing product aqueous solution of chlorine dioxide from the chlorine separating zone.

This invention further provides an improvement in a continuous recycle, substantially-closed loop method for producing chlorine dioxide including conducting an electrolysis reaction conducting a hydrogen chloride combustion and conducting a chlorine dioxide synthesis, the improvement comprising: conducting an electrolyzing reaction in an aqueous solution of alkali metal salts of a sufficient concentration to provide a liquor containing more than about 400 g/L chlorate ions and note than about 90 g/L chloride ions; passing the products of electrolysis to a reaction zone, collecting gases in an upper header/degasifier zone, withdrawing gases from the header/degasifier zone for conveying to the hydrogen chloride combustion, and withdrawing a stream of a fresh aqueous solution containing more than about 400 g/L of an alkali metal chlorate and more than about 90 g/L of an alkali metal chloride from the reaction zone; dividing the withdrawn stream into two streams, one stream being conveyed to a chlorine dioxide synthesis zone, the other stream being passed to a flash evaporating zone, where it is mixed with a liquid comprising spent, in part, chlorate-ion-depleted aqueous solution also containing over 90 g/L alkali metal chlorides and residual hydrochloric acid; conducting the liquor containing alkali metal chlorates and alkali metal chlorides from the flash evaporating zone to a chlorate reaction zone for recycling to an electrolysis zone; demisting the vapor in an upper demisting zone of the flash zone and passing outlet from the demisting zone to a condensing zone; passing outlet from the demisting zone to a condensing zone; conducting condensate from the condensing zone to an acid scrubbing zone of the hydrogen chloride combustion; and passing vapours from the condensing zone to a gas compression zone.

This invention still further provides an improvement in a continuous recycle, substantially-closed-loop method for producing chlorine dioxide including an electrolysis, a hydrogen chloride combustion and a chlorine dioxide synthesis, the improvement comprising: conducting aqueous solution containing over about 400 g/L chlorate ions and about 90 g/L chloride ions to the lower regions of a chlorine dioxide synthesis zone, and withdrawing spent aqueous solution containing alkali metal chlorates and alkali metal chlorides from the chlorine dioxide synthesis zone for feeding to the electrolysis zone; conducting aqueous hydrochloric acid from the hydrogen chloride combustion to the lower region of the chlorine dioxide synthesis zone; gradually heating the aqueous solution containing over about 400 g/L alkali metal chlorates and over about 90 g/L alkali metal chlorides/aqueous hydrochloric acid as it passes upwardly through the chlorine dioxide synthesis zone, thereby to produce chlorine dioxide gas and chlorine gas; cooling the gases and conducting the cooled gases to the lower region of an absorption zone; conducting chill water into the upper region of the absorption zone where it passes downwardly in a countercurrent direction to upwardly flowing gases, thereby to dissolve chlorine dioxide gas; conducting aqueous effluent from the absorption zone to a second contact zone where downwardly flowing aqueous effluent is contacted countercurrently with upwardly flowing stripping air which is fed to an upper region of the second contact zone; withdrawing aqueous chlorine dioxide product from the lower regions of the second contact zone and withdrawing gaseous effluent from the upper region of the second contact zone; and withdrawing gaseous effluent from the upper region of the absorption zone for conducting to the hydrogen chloride combustion zone.

The invention also provides an improvement in a continuous recycle, substantially-closed-loop method for producing chlorine dioxide including an electrolysis, a hydrogen chloride combustion and a chlorine dioxide synthesis, the improvement comprising: conducting aqueous solution containing over about 400 g/L chlorate ions and over about 90 g/L chloride ions to the lower regions of a chlorine dioxide synthesis zone, and withdrawing spent aqueous solution containing alkali metal chlorates and alkali metal chlorides from the chlorine dioxide synthesis zone for feeding to the electrolysis zone; conducting aqueous hydrochloric acid from the hydrogen chloride combustion zone to the lower region of the chlorine dioxide synthesis zone; gradually heating -the aqueous solution containing alkali metal chlorates and alkali metal chlorides/aqueous hydrochloric acid as it passes upwardly through the chlorine dioxide synthesis zone, thereby, to produce chlorine dioxide gas and chlorine gas; cooling the gases and conducting the gases to the lower region of gas separation zone; conducting aqueous hydrochloric acid to the upper region of the gas separation zone where it passes downwardly countercurrent to upwardly flowing cooled gases, thereby to dissolve gaseous chlorine dioxide preferentially; withdrawing gaseous effluent from the gas separation zone for conducting to the hydrogen chloride combustion zone; passing liquid effluent from the gas separation zone along width makeup aqueous hydrochloric acid, with or without chlorine reducing agent, e.g. hydrogen perioxide, or methanol (at high acidity) to a receiving/stripping zone where it is subjected to the action of heated air admitted to the lower region of the receiving/stripping zone to strip chlorine dioxide gas from the hydrochloric acid solution of chlorine dioxide gas; withdrawing liquid effluent from the receiving/stripping zone and dividing the liquid into two streams, one stream being fed to the lower region of the chlorine dioxide synthesis zone along with aqueous hydrochloric acid also fed thereto, the second stream being fed to refrigeration zone for conducting of chilled aqueous hydrochloric acid to the upper region of the gas separation zone; withdrawing gaseous effluent from the receiving/stripping zone and conducting the withdrawn gaseous effluent to the lower region of a chlorine dioxide absorption zone; conducting chill water to the upper region of the chlorine dioxide absorption zone where it flows downwardly countercurrent to upwardly flowing chlorine dioxide gas; withdrawing aqueous chlorine dioxide product from the lower region of the chlorine dioxide absorption zone; and venting gases from the upper region of the chlorine dioxide absorption zone.

The invention also provides a closed loop system for the production of chlorine dioxide, the system comprising: A) a hydrogen chloride combustion chamber, the hydrogen chloride combustion chamber including separate inlet means for hydrogen, for water, for chlorine, and for make-up and recycled chlorine, and outlet means for hydrochloric acid; B) an electrolytic cell, the electrolytic cell including separate outlet means for hydrogen, which is connected to the inlet means for hydrogen to the hydrogen chloride combustion chamber, for water vapor, which is connected to the inlet means for water to the hydrogen chloride combustion chamber, and for product alkali metal chlorate solution, and inlet means for recycled alkali metal chlorate solution; and C) a chloride dioxide generator, the chlorine dioxide generator including separate inlet means for hydrochloric acid, which is connected to the outlet means for hydrochloric acid from the hydrogen chloride combustion chamber, for alkali metal chlorate solution, which is connected to the outlet means for product alkali metal chlorate, and for chill water, and product flow means.

This invention also provides a substantially-closed-loop system for the continuous recycle method for producing chlorine dioxide comprising: (A) an electrolyzer including an inlet means for brine make-up, an inlet means for recycled chlorate/chloride solution, outlet means for gaseous hydrogen, outlet means for chlorate/chloride solution, outlet means for water vapor, and a source of electric current; (B) a hydrogen chloride combustion chamber including an inlet for gaseous hydrogen connected to the outlet means for gaseous hydrogen from the electrolyzer, an inlet for water vapor connected to the outlet means for water vapor from the electrolyzer, inlet means for chlorine gas make-up, inlet means for recycled chlorine gas, and outlet means for aqueous hydrochloric acid; and (C) a chlorine dioxide synthesizer including outlet means for aqueous hydrochloric acid connected to the outlet means for aqueous hydrochloric acid from the hydrogen chloride combustion chamber, inlet means for chlorate/chloride solution connection to the outlet from chlorate/chloride from the electrolyzer, inlet mean from chill water, and outlet means for aqueous solution of chlorine dioxide or product.

This invention also provides an improvement in an substantially-closed-loop system for the continuous recycle method for producing chlorine dioxide, including interlinked electrolytic cell apparatus, hydrogen chloride combustion chamber apparatus and chlorine dioxide synthesizer apparatus, and including an improved electrolytic cell comprising: an electrolyzer including anodes and cathodes therein and a source of electric current connectable thereto, the electrolyzer being integrated with a reaction vessel by means of liquor/gas outlet line and recycle liquor inlet line; the reaction vessel including a liquor outlet line for connection to an inlet line leading to a flash tank and for connection of a branch line leading to the chlorine dioxide synthesizer apparatus, and a liquor inlet line from the flash tank, the reaction vessel also including an upper header/degasifier and a gas outlet line from the header/degasifier leading to the hydrogen chloride combustion chamber apparatus; and the flash tank including an upper demister device and an upper water vapour outlet line leading to a absorber the absorber including a condensate withdrawal line connected to a condensate receiving tank, which is connected to a hydrogen chloride scrubber of the hydrogen chloride combustion chamber apparatus, and a gas withdrawal line leading a gas inlet line of the hydrogen chloride combustion chamber apparatus.

This invention also provides an improvement in a substantially-closed-loop system for the continuous recycle method for producing chlorine dioxide, including interlinked electrolytic cell apparatus, hydrogen chloride combustion chamber apparatus and chlorine dioxide synthesizer apparatus, and including an improved hydrogen chloride combustion chamber apparatus comprising: a synthesis reactor provided with a pair of vertically spaced apart water quenching lines and an upper chlorine gas feed line, an inlet header, the inlet header being provided with a hydrogen gas feed line leading from a header/degasifier of the electrolysis cell apparatus and a source of ignition of the hydrogen gas; an absorber connected to a lower hydrogen chloride gas outlet from the synthesis reactor, the absorber including a lower condensed hydrogen chloride outlet line; and a hydrogen chloride scrubber, the hydrogen chloride scrubber including a lower condensed hydrogen chloride inlet line leading from the absorber, an upper water inlet line whereby water flows downwardly countercurrently to upwardly flowing hydrogen chloride gas, an upper scrubber gas bleed line and a lower aqueous hydrochloric acid solution for connection to the chlorine dioxide synthesizer apparatus.

This invention also provides an improvement in a substantially-closed-loop system for the continuous recycle method for producing chlorine dioxide, including interlinked electrolytic cell apparatus, hydrogen chloride combustion chamber apparatus and chlorine dioxide synthesizer apparatus, and including an improved chlorine dioxide synthesizer apparatus comprising: a chlorine dioxide synthesizer including a bottom inlet line for aqueous hydrochloric acid, a lower inlet line for aqueous liquor containing alkali metal chlorates and alkali metal chlorides and an intermediate outlet line for spent liquor containing alkali metal chlorates and alkali metal chlorides, the chlorine dioxide synthesizer including a plurality of vertically spaced-apart heat exchanger for controlling the temperature of liquor within the chlorine dioxide synthesizer, an upper integrated cooling/condensing system including a cooling heat exchanger and a gas condensing heat exchanger the gas condensing heat exchanger including inlet means for chill water and outlet means for gaseous products of reaction; an absorber column connecting at its lower portion of the outlet means for gaseous products of reaction from the chlorine dioxide synthesizer, the absorber column including an upper inlet line for chill water, and intermediate inlet line for recycled gas a bottom outlet line for aqueous liquor containing chlorine dioxide, and top outlet line for discharging gas to be connected to the hydrogen chloride combustion chamber apparatus; and a barometric leg liquid column, the barometric leg liquid column including an upper inlet line for aqueous liquor containing chlorine dioxide withdrawing from the absorber column, an intermediate line for introduction of stripping air, a top outlet line for stripped air connected to the intermediate line to the absorber column and a bottom outlet line for aqueous chlorine dioxide liquor product.

This invention also provides an improvement in a substantially-closed-loop system for the continuous recycle method for producing chlorine dioxide, including interlinked electrolysis cell apparatus, hydrogen chloride combustion chamber apparatus and chlorine dioxide synthesizer apparatus, and including an improved chlorine dioxide synthesizer apparatus comprising: a chlorine dioxide synthesizer including a bottom inlet line for aqueous hydrochloric acid, a lower inlet line for aqueous liquor containing alkali metal chlorates and alkali metal chlorides and an intermediate outlet line for spent liquor containing alkali metal chlorates, and alkali metal chlorides, the chlorine dioxide synthesizer including a plurality of vertically spaced-apart heat exchanger for controlling the temperature of liquor within the chlorine dioxide synthesizer, an upper integrated cooling/condensing system including a cooling heat exchanger and a gas condensing heat exchanger the gas condensing heat exchanger including inlet means for chill water and outlet means for gaseous products of reaction: a chlorine gas separating tower, the chlorine gas separating tower including a lower inlet line connected to the outlet means for gaseous products of reaction from the chlorine dioxide synthesizer, and an upper inlet means for aqueous hydrochloric acid solvent, a top outlet means for unabsorbed gases, connectable to chlorine gas inlet to the hydrogen chloride combustion chamber, and bottom outlet means from chlorine dioxide dissolved in liquor solution of hydrogen chloride; and a receiver/stripper, the receiver/stripper including an upper inlet line connected to the bottom outlet means for the chlorine gas from the chlorine gas separating tower, and also connected to an inlet line for make-up aqueous hydrogen chloride, with or without chlorine reducing agents, e.g. hydrogen peroxide or methanol (at high acidity) and an intermediate inlet line for heated stripping and, a bottom outlet line for recycle aqueous hydrogen chloride, the bottom outlet line being connected to a refrigeration/chiller apparatus, which is connected to the upper inlet line for aqueous hydrogen chloride to the chlorine gas separating tower, and also to the bottom inlet line for aqueous hydrogen chloride to the chlorine dioxide synthesizer and an upper outlet line for stripped gases and a chlorine dioxide absorber, the chlorine dioxide absorber including a low inlet line connected to the upper chlorine dioxide gas outlet line from the receiver/stripper, and an upper inlet line for chill water for downwardly flowing countercurrent which with upwardly flowing gaseous chlorine dioxide, a top gas vent outlet line and a bottom aqueous chlorine dioxide product outlet line.

Other Features of This Invention

The continuous process of the invention preferably includes the step of flash evaporating liquid in the electrolysis zone, thereby to provide water for conducting to the hydrogen chloride absorption zone.

In such continuous process, the heal values in the alkali metal chlorate solution are used as heat for carrying out the reaction in the chlorine dioxide synthesis zone by limiting depletion of chlorate ion to less than about 30%, thus providing for higher feed rates of chlorate solution with inherent heat values of solution, preferably less than about 20%.

The alkali metal may be either sodium or lithium for high chlorate ion concentrations and for electrolytic process benefits. The chlorate ion concentration preferably is in the range of about 600 to about 1,200 g/L. The process preferably includes the step of inter-mixing reagents in the chlorine dioxide synthesis zone by a high velocity discharge from multi-capillary inlet zones feeding the hydrochloric acid, preferably about 2 meter/second.

Such process may include the step of adding methanol to the chlorine dioxide synthesis zone for the purpose of lowering by-product chlorine gas generation. The process may further include means for the discharge of chlorine dioxide synthesis zone gases as a weak hydrochloric acid scrub for chlorine dioxide absorption with chlorine solubility being suppressed by the hydrogen chloride and the addition of a chlorine reducing agent with recovery of chlorine as hydrochloric acid, e.g. adding hydrogen peroxide or methanol. It may also include a subsequent desorption step for recovery of chlorine dioxide by air stripping at elevated temperature. In such a case, it would include the step of recooling the acid solution before recycling for the re-new scrub cycle. The process may include the step of air stripping the absorber liquid to improve the chlorine dioxide: chlorine ratio, followed by discharging the gases to an elevated point in the chlorine dioxide synthesis zone, or by recycling the gases to the chlorine dioxide synthesis zone for dilution of generator gases.

The concentration of aqueous solution of hydrogen chloride is up to about 37% by weight, preferably from about 30% to about 37% by weight.

The temperature of the aqueous solution of hydrochloric acid fed to the chlorine dioxide synthesis zone is a maximum of about 30° C.

The reaction between the aqueous solution containing alkali metal chlorate and the aqueous solution of hydrogen chloride takes place at a gradually increasing temperature in an upwardly flowing chlorine dioxide synthesis zone from a lower temperature of about 50° C. to an upper temperature of about 80° C.

The aqueous solution containing an alkali metal chlorate and the aqueous solution of hydrogen chloride are inter-mixed within a time of about one second. The process is preferably carried out for a 90% completion in about 10 minutes at a maximum temperature of about 80° C.

In one preferred process, the aqueous feed solution contains about 800 g/L sodium chlorate and about 90 g/L sodium chloride at an infeed temperature of about 85° C., the aqueous solution of hydrogen chloride has a concentrate of about 37% by weight at an infeed temperature of about 22° C., the inter-mix rate at a zone volume ratio of chlorate feed to hydrogen chloride feed is about 10, the rate of being about 2 m/sec, and the reaction temperature is initially about 62° C. and is raised to about 85° C. over a period of time of about 5 minutes; whereby to provide a 90% depletion of the hydrogen chloride feed, a ratio of sodium chlorate to sodium chloride of about 4 and a chlorine dioxide yield of 97%, especially wherein the aqueous feed solution contains small amounts of dichromate ions.

In another preferred process, the aqueous feed solution contains about 1200 g/L lithium chlorate and about 100 g/L lithium chloride at an infeed temperature of about 70° C., the aqueous solution of hydrogen chloride has a concentration of about 37% by weight at an infeed temperature of about 22° C., the intermix rate at a zone volume ratio of chlorate feed to hydrogen chloride feed is about 10, the rate of being about 2 m/sec and the reaction temperature is initially about 50° C. and is raised to above 85° C. over a period of time of about 5 minutes; whereby to provide a 90° C. depletion of the hydrogen chloride feed, a ratio of lithium chlorate to lithium chloride of about 4 and a chlorine dioxide of 98%, especially the aqueous feed solution contains small amount of chromate ions.

In the improved electrolysis reaction, the products of electrolysis in the reaction zone are cooled by heat exchanger means within the reaction zone, especially wherein the temperature of heating within the reaction zone is about 85° C.

The gases in the header/degasification zone are substantially gaseous hydrogen. The condensate from the condensing zone is temporarily stored in a condensate storage zone. The vapours from the gas compression zone preferably are conducted to the hydrogen chloride combustion.

The degasifying step is preferably carried out in the reaction zone, where the temperature is controlled.

The process may further include the step of mixing spent liquid from the chlorine dioxide generator with the conducted liquor in the flash zone.

The improved hydrogen chloride combustion preferably includes the step of conducting the hydrogen gas through a fire-arresting zone prior to conducting the hydrogen gas to the header zone to protect against flash back.

The product hydrogen chloride gas is preferably conducted through a condensation zone before it is fed to the hydrogen chloride scrubbing zone. The process may include injecting water into the hydrogen stream to control the reaction temperature to about 1500° C. It may also include continuously feeding recycle chlorine gas from the chlorine dioxide synthesis to the hydrogen chloride combustion zone when the temperature therein exceeds about 600° C. It may further also include maintaining the temperature at the outlet of the absorber below about 300° C. to prevent failure of the absorber. The water may include aqueous condensate from the electrolysis zone. The process may still further include temporarily storing the aqueous solution of hydrogen chloride in a holding zone prior to conducting the aqueous solution to the chlorine dioxide synthesis zone.

The improved chlorine dioxide reaction is preferably carried out at reaction temperatures which range from a lower temperature of about 40° C. to an upper temperature of about 90° C., and a temperature of about 100° C in an upper combined degasifier and gas zone. The concentration of hydrochloric acid is about 30% to about 37% by weight. The aqueous chlorate/chloride reaction liquor is fed in through a high velocity of discharge from multi-capillary inlet zones, especially where the high velocity is about 2 meters/second.

In one preferred such process, the aqueous feed solution contains about 800 g/L sodium chlorate and about 90 g/L sodium chloride at an infeed temperature of about 85° C., the aqueous solution of hydrogen chloride has a concentrate of about 37% by weight at an infeed temperature of about 22° C., the intermix rate at a zone volume ratio of chlorate feed to hydrogen chloride feed is about 10, the rate of being about 2 m/sec and the reaction temperature is initially about 62° C. and is raised to about 85° C. over a period of time of about 5 minutes; whereby to provide about a 90% depletion of the hydrogen chloride feed, a ratio of sodium chlorate to sodium chloride of about 4 and a chlorine dioxide yield of about 97%, especially wherein the aqueous feed solution contains small amounts of dichromate ions.

In another preferred such process, the aqueous feed solution contains about 1200 g/L lithium chlorate and about 100 g/L lithium chloride at an infeed temperature of about 70° C., the aqueous solution of hydrogen chloride has a concentration of about 37% by weight at an infeed temperature of about 22° C., the intermix rate at a zone volume ratio of chlorate feed to hydrogen chloride feed is about 10, the rate of being about 2 m/sec, and the reaction temperature is initially about 50° C. and is raised to about 85° C. over a period of time of about 5 minutes; whereby to provide about a 90% depletion of the hydrogen chloride feed, a ratio of lithium chlorate to lithium chloride of about 4 and a chlorine dioxide of about 98%, especially wherein the aqueous feed solution contains small amount of dichromate ions.

In another improved chlorine dioxide reaction, the reaction temperature in the chlorine dioxide synthesis zone ranges from a lower temperature of about 40° C. to an upper temperature of about 90° C., to 100° C. limited by the absolute pressure in the upper zone and cooled to about 80° C. in degasifier zone.

The concentration of hydrochloric acid is about 30% to about 37% by weight discharged into chlorine dioxide reacting zone employing capilliary tubing for multipoint entry at high velocity, about 2 meters/second. The discharged gases from the chlorine dioxide generator may be scrubbed employing a hydrochloric acid. The hydrochloric acid preferably has a concentration of about 3 to about 30 g/L and is at a temperature of about 2° C.

The acidic solution of chlorine dioxide preferably contains about 12 to about 14 g/L ClO$_2$ and is at a temperature about 3° C. The process preferably includes feeding make-up hydrochloric acid of about 37% by weight to the receiving/stripping zone with or without chlorine reducing agent, e.g. hydrogen peroxide or methanol (if acidity is high). The chlorine dioxide solution removed from the receiving/stripping zone preferably has a ClO$_2$:Cl$_2$ ratio greater than about 16 if no chlorine reducing agent is employed. The stripper liquor removed from the receiving/stripping zone preferably contains about 2 to about 5 g/L chlorine dioxide at a temperature of about 25° C. to about 35° C.

The improved closed loop system preferably includes a plurality of multi-capillary tubes for feeding the hydrochloric acid to the chlorine dioxide generator, thereby to provide for intermixing of the reagents in the chlorine dioxide generator.

The improved electrolytic cell preferably includes an electrolyzer constructed out of glass fibre reinforced plastic with a liner of fluorocarbon plastic. The reaction vessel is preferably provided with an internal immersed heat exchanger. The reaction vessel, the header/degasifier and the connecting means preferably are formed of titanium.

The improved hydrogen chloride combustion chamber apparatus includes a reactor which is preferably constructed of steel lined with a fire-resistant fire brick. The inlet is preferably in the form of a quartz tube. The combustion chamber preferably includes a fire arrester interposed in the hydrogen feed line to the combustion chamber. The combustion chamber preferably includes a sparker wire connected to a source of high voltage.

The combustion chamber may also include a receiving tank connected to the outlet from the scrubber. The scrubber is preferably constructed of glass fibre reinforced plastic lined with fluorocarbon plastic. The connecting lines preferably are formed of a fluorocarbon plastic.

In both embodiments of the improved chlorine dioxide synthesizer apparatus as described above, a plurality of multi-capillary tubes is included for feeding the hydrochloric acid to the chlorine dioxide generator, thereby to provide for intermixing of the reagents in the chlorine dioxide generator. The generator is preferably provided with one or several zones, namely, a lower internal submerged heating heat exchanger, an upper internal submerged cooling heat exchanger, and an integrated upper gas zone cooling/condensing system.

The apparatus includes a gas outlet line from the upper gas chamber of the generator. All components preferably are made of titanium.

Thus, a main object of this invention has been achieved. In such object, economics is realized by a high rate of reaction, using heat values realized from chlorate feed solution, water balance by flash evaporation, by utilizing chlorine compression for low absolute pressure, high chlorine recovery, and high efficiency in the chlorine dioxide generation and electrolytic system respectively.

As has been previously alluded to, the principal reactions of the present integrated chlorine dioxide production process are as follows (where M=sodium and/or lithium):

Chlorate is produced according to following electrochemical reaction:

$$MCl + 3H_2O + 6\text{Faradays} \rightarrow MClO_3 + 3H_2 \quad (1)$$

Hydrogen chloride synthesis is by combustion:

$$Cl_2 + H_2 \rightarrow 2HCl \quad (2)$$

Chlorine dioxide is generated by purging the alkali metal and reducing the chloric acid:

$$2MClO_3 + 2HCl \rightarrow 2MCl + 2HClO_3 \quad (3)$$

$$2HClO_3 + 2HCl \rightarrow 2ClO_2 + Cl_2 + 2H_2O \quad (4)$$

The most significant inefficiency occurs when chlorate is reduced to chlorine:

$$HClO_3 + 5HCl \rightarrow 3Cl_2 + 3H_2O \quad (5)$$

The efficiency ($\Sigma$) of chlorine dioxide generation is computed as yield of chlorine dioxide from chlorate. This yield may be expressed as per HOLT's formula:

$$r = 2y/6 - 5y$$

where $r$ = mol ratio of $ClO_2:Cl_2$
and $y$ = mols of $ClO_2$ per mol of $ClO_3$

BRIEF DESCRIPTION OF THE DRAWINGS

In the accompanying drawings.

DESCRIPTION OF PREFERRED EMBODIMENTS

Figure 1:
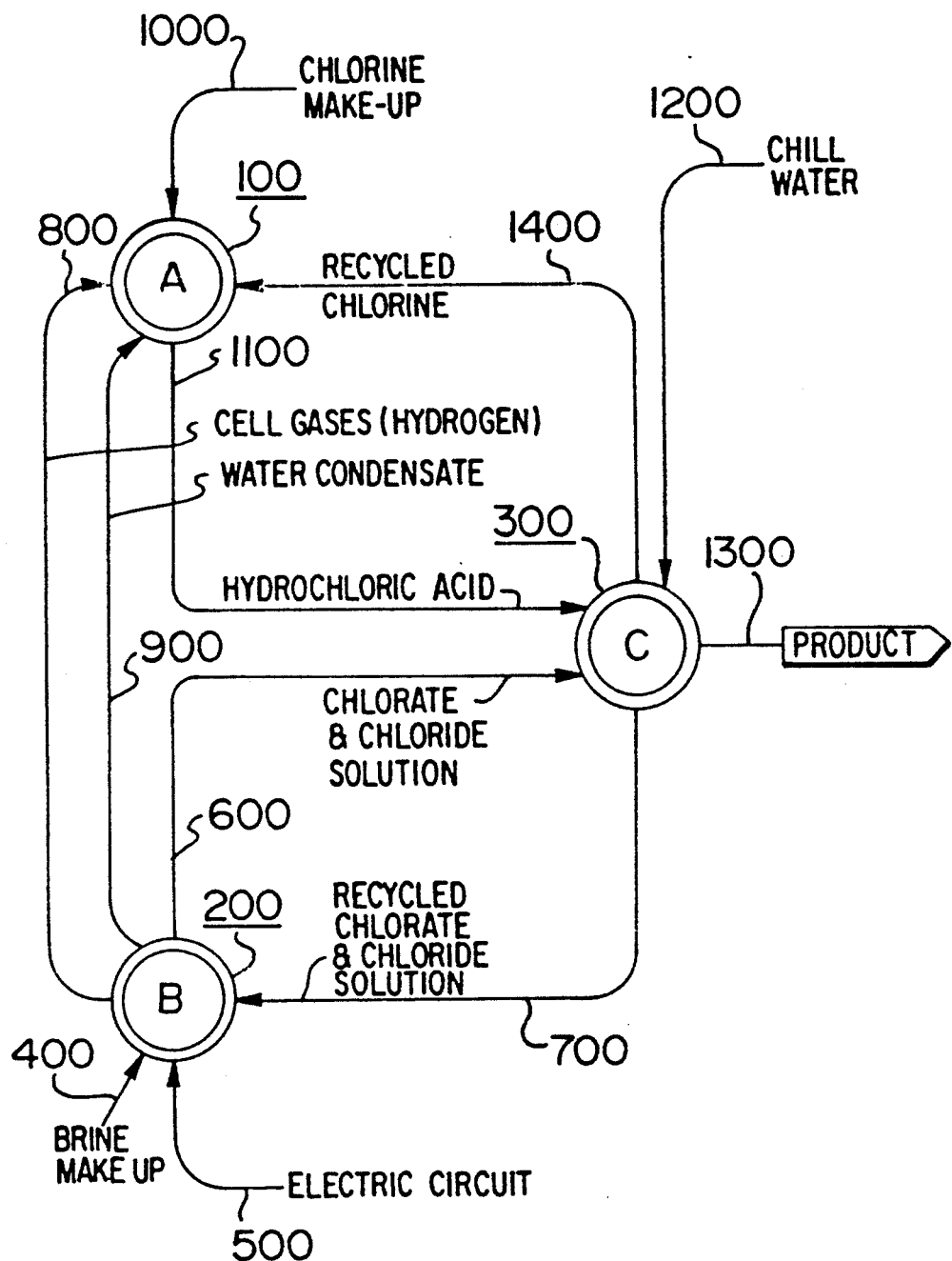
FIG. 1 represents a simplified summary of the integrated process and system of the present invention.

Description of FIG. 1

As seen in FIG. 1, the main elements of the invention, in the form of a closed-loop system, include hydrogen chloride synthesis reactor 100 (Zone A), an electrolytic cell 200 (Zone B) and a chlorine dioxide generator 300 (Zone C). Initial charge of brine make-up solution enters the system by inlet line 400, where it is subjected in electrolytic cell 200 to electric current admitted by bus 500. The chlorate solution, along with chlorides, formed in electrolytic cell 200 is fed by line 600 to chlorine dioxide generator 300. Partially reacted chlorate solution is passed by way of recycle line 700 from chlorine dioxide generator 300 to electrolytic cell 200. Cell gases, mainly hydrogen are vented from electrolytic cell 200 via line 800 to hydrogen chloride synthesis 100. Water vapor formed in electrolytic cell 200 is condensed, and water condensate is led via line 900 to hydrogen chloride synthesis reactor 100. Chlorine make-up is fed via line 1000 to the hydrogen chloride synthesis reactor 100, where reaction is carried out between hydrogen and chlorine to form hydrogen chloride gas. The water condensate reacts with the hydrogen chloride gas in hydrogen chloride synthesis reactor 100 to form hydrochloric acid, which is conducted to chlorine dioxide generator 300 via line 1100.

Chill water is fed to chlorine dioxide generator 300 through line 1200 to cool the reacted product and to provide water to form the aqueous solution of chlorine dioxide product which is removed from line 1300. Recycled chlorine gas is returned to hydrogen chloride synthesis reactor 100 via line 1400.

Figure 2:
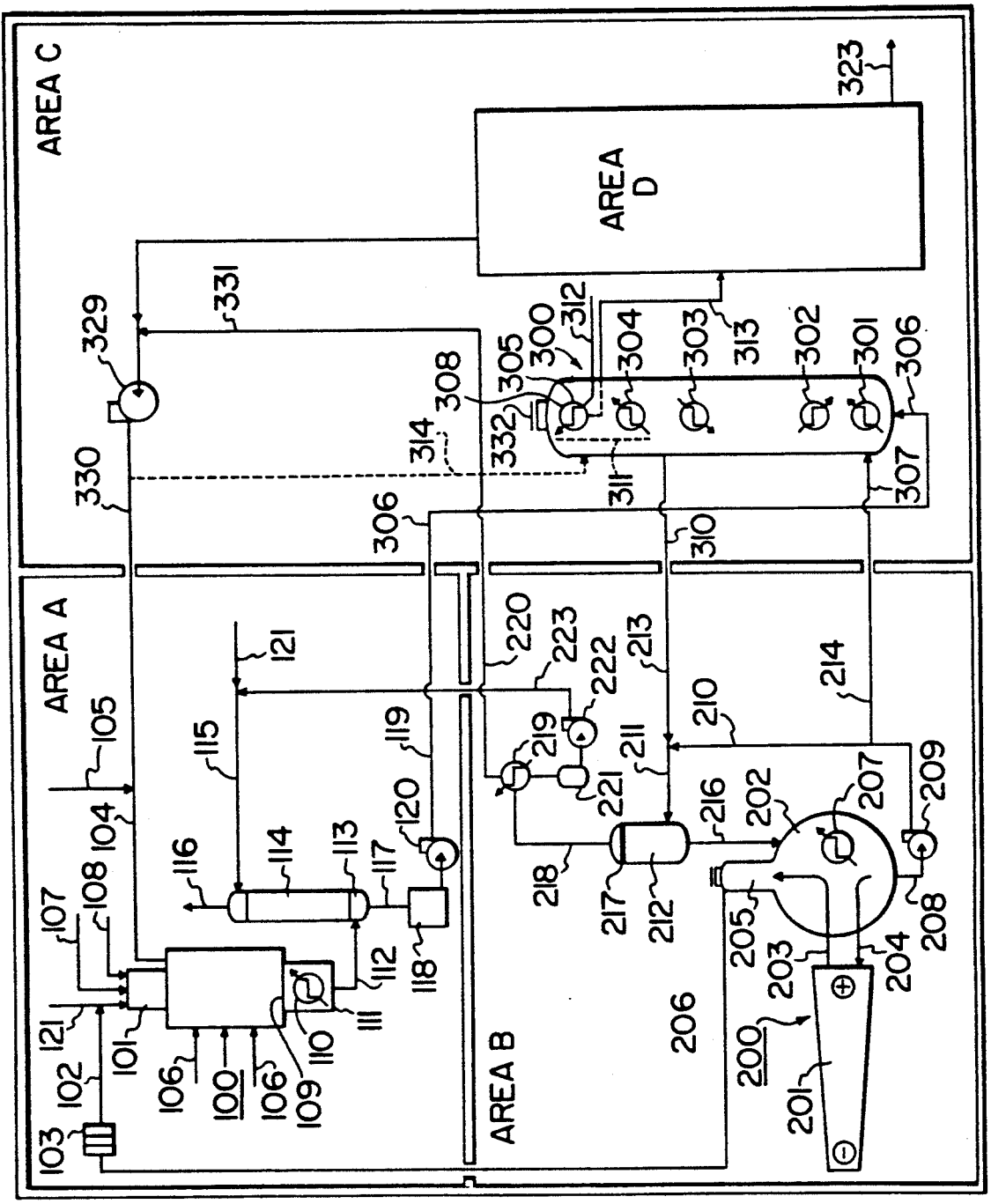
FIG. 2 is a schematic flow diagram of the integrated process and system of the present invention in which the system for absorbing chlorine dioxide/separating chlorine is shown as block D.

Description of FIG. 2

A more detailed description of the apparatus components is now given in respect of FIG. 2. Hydrogen chloride synthesis reactor 100 may be a conventional synthesis system or, may be constructed of steel lined with an acid-resistant fire brick. The hydrogen chloride synthesis reactor 100 is capped with an inlet header 101, which is preferably in the form of a quartz tube. Connected to the inlet header 101 is a top feed line 102 protected by a fire arrester 103. A branch line 121 leads to top feed line 102. The hydrogen chloride synthesis reactor 100 is provided with an upper chlorine feed line 104 which is provided with a make-up chlorine demand branch line 105, and with a pair of intermediate water quenching feed lines 106. A pilot gas feed line 107 is fitted to the inlet header 101. A high voltage wire 108 is also fitted to the inlet header 101.

The lower end of the hydrogen chloride synthesis reactor 100 reactor is provided with an outlet 109, connected via a flow control valve 110 to an absorber 111. Absorber 111 is connected via line 112 to the lower inlet 113 of hydrogen chloride scrubber 114. Line 112 is preferably formed of glass or of a fluorocarbon plastic, e.g., the polytetrafluoroethylene known by the trademark TEFLON. The hydrogen chloride scrubber 114 is preferably constructed of FRP (glass-fiber-reinforced plastic) with a fluorocarbon plastic liner, e.g. the polytetrafluoroethylene known by the trademark TEFLON. An upper line 115 leads to the upper region of the hydrogen chloride scrubber 114. A bleed line 116 is provided at the top of the hydrogen chloride scrubber 114, and a product effluent line 117 leads to a receiving tank 118. The receiver tank is provided with an outlet line 119 fitted with a flow control valve or metering pump 120.

The electrolytic cell. 200 includes an electrolyzer 201, preferably constructed out of FRP with a liner of a fluorocarbon plastic, e.g. the polytetrafluoroethylene known by the trademark TEFLON. The electrolyzer 201 is integrated with a reactor vessel 202 by means of interconnected outlet line 203 and refeed line 204. Atop the reactor vessel 202, there is a header/degasifier 205. A gas vent line 206 leads from the header/degasifier 205. An internal, immersed heat exchanger 207 is provided within the reactor vessel 202. The reactor vessel 202, the header/degasifier 205, and the piping 203,204 are all preferably formed of titanium.

A lower outlet line 208 leads via a pump 209 to a main liquor outlet line 210. Line 210 is connected via stream line 211 to a flash tank 212, and also branches to be connected to lower liquor inlet line 214. The flash tank 212 includes a liquor return-line 216. Flash tank 212 contains demister 217, the outlet of which leads to upper outlet line 218 from flash tank 212.

Outlet line 218 is connected via an absorber 219 both to connecting line 220 and to condensate receiver tank 221. Condensate receiver tank 221 is connected, via pump 222, to acid scrubber 114 via line 223.

The chlorine dioxide generator 300 depicted in FIG. 2 is preferably a novel chlorine dioxide generator, and hence, the invention will be described with respect to that chlorine dioxide generator (proposed application titled UNITARY MULTI-FUNCTIONAL VERTICAL VESSEL). However, it is considered that any vertically-disposed chlorine dioxide generator, e.g. the chlorine dioxide generators disclosed in the Westerlund Canadian Patent 782,574, in the Westerlund Canadian Patent 809,143, in the Westerlund Canadian Patent 922,661 or in the Westerlund U.S. Pat. No. 3,442,778, may alternatively be used as chlorine dioxide generators in the practice of this invention.

As seen in FIG. 2, the chlorine dioxide generator 300 is provided with an internal submerged heating heat exchanger 302, an internal, submerged steam heated heat exchanger 303, an internal submerged cooling heat exchanger 304, and an integrated cooling/condensing system 308. A main lower inlet line 306 is connected to a chlorine dioxide generator 300 from the aqueous hydrogen chloride receiving tank 118. The chlorine dioxide generator is provided with a spent liquor outlet recycle line 310.

Heat exchanger 304 is connected, via a cooling water line to heat exchanger 305. Heat exchanger 305 is provided with chill water inlet line 312. A gas outlet line 313 leads from the upper gas chamber of chlorine dioxide generator 300 to a chlorine separation and chlorine dioxide absorption zone D which will be described in detail hereinafter.

A gas recycle line 314 is connected to the upper chamber of the chlorine dioxide generator 300. Gas outlet line 313 leads to the inlet of a chlorine separation and chlorine dioxide absorption system. Thus, embodiments of such a system will be described hereinafter. Chlorine dioxide generator 300 contains a gas separation screen 311. Spent liquor outlet recycle line 310 from chlorine dioxide generator 300 becomes recycle line 213, which merges with main liquor outlet line 210 and then enters flash tank 212 via stream line 211 with reference to FIGS. 3 and 4. Tail gases are discharged through discharge line 328. Discharge line 328 is connected to the inlet side of a compressor 329, and compressor 329 is provided with a compressed gas outlet line 330.

All the apparatus used in the chlorine dioxide generator system including the connecting conduits, are preferably made of titanium.

Aqueous chlorine dioxide is removed via a storage feed line 332.

Figure 3:
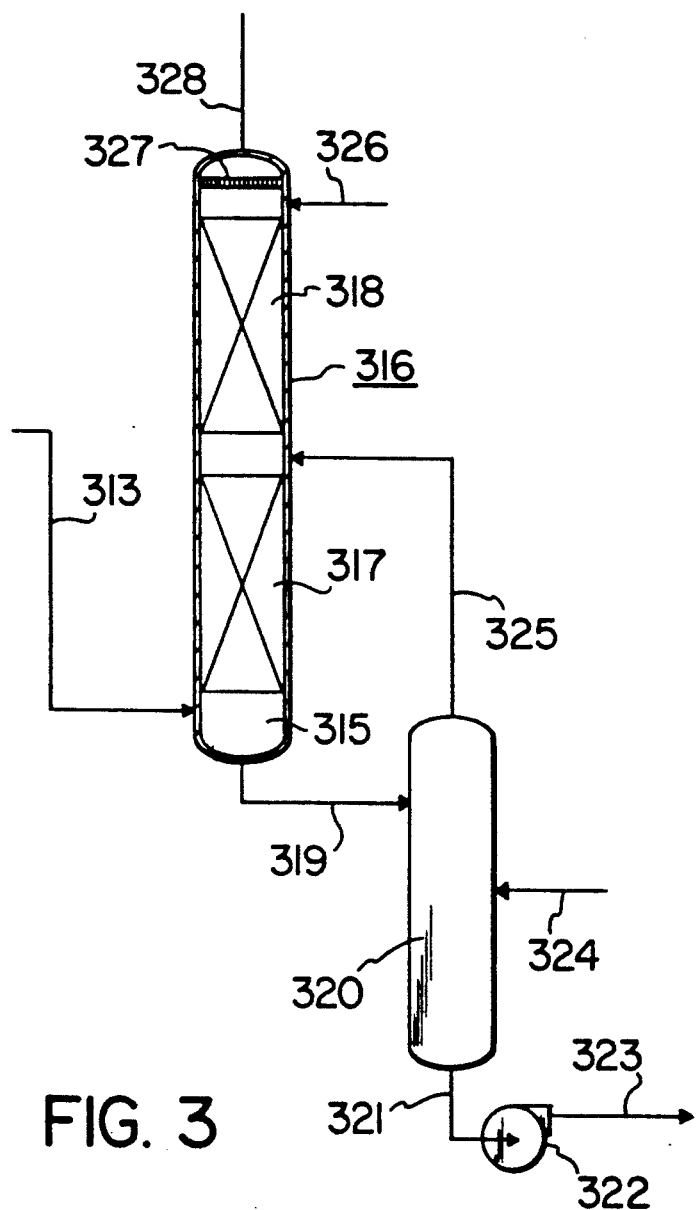
FIG. 3 is a schematic flow diagram of one system for absorbing chlorine dioxide/separating chlorine in the process and system of FIG. 2.

Description of FIG. 3

FIG. 3 describes one alternative embodiment of a chlorine separation and chlorine dioxide absorption system where a small amount of air is used for stripping. As seen in FIG. 3, gas outlet line 313 from chlorine dioxide generator 300 is connected to the lower chamber 315 of line absorber column 316. The absorber column 316 includes bottom section 315, of a lower section 317 and an upper section 318. The bottom section 315 of the absorber column 316 is connected, via line 319 to a barometric leg liquid column 320. Barometric leg liquid column 320 includes a liquid product outlet 321 discharged by pump 322 to the previously described storage feed line 323, which is connected to an insulated storage tank (not shown). An air stripping inlet line, or a compressed air feed line 324 is connected to the barometric leg liquid column 320. Stripped gases outlet line 325 is connected to an elevated but mid-point of the absorber column 316.

Absorber column 316 is also provided with a chill water inlet 326. A demister 327 may be provided in the upper portion of the absorber column 316. Absorber column 316 is also provided with the previously described tail gases discharged line 328. As previously described, tail gas discharge line 328 is connected to the inlet side of a compressor 329, and compressor 329 is provided with a compressed gas outlet line 330.

Figure 4:
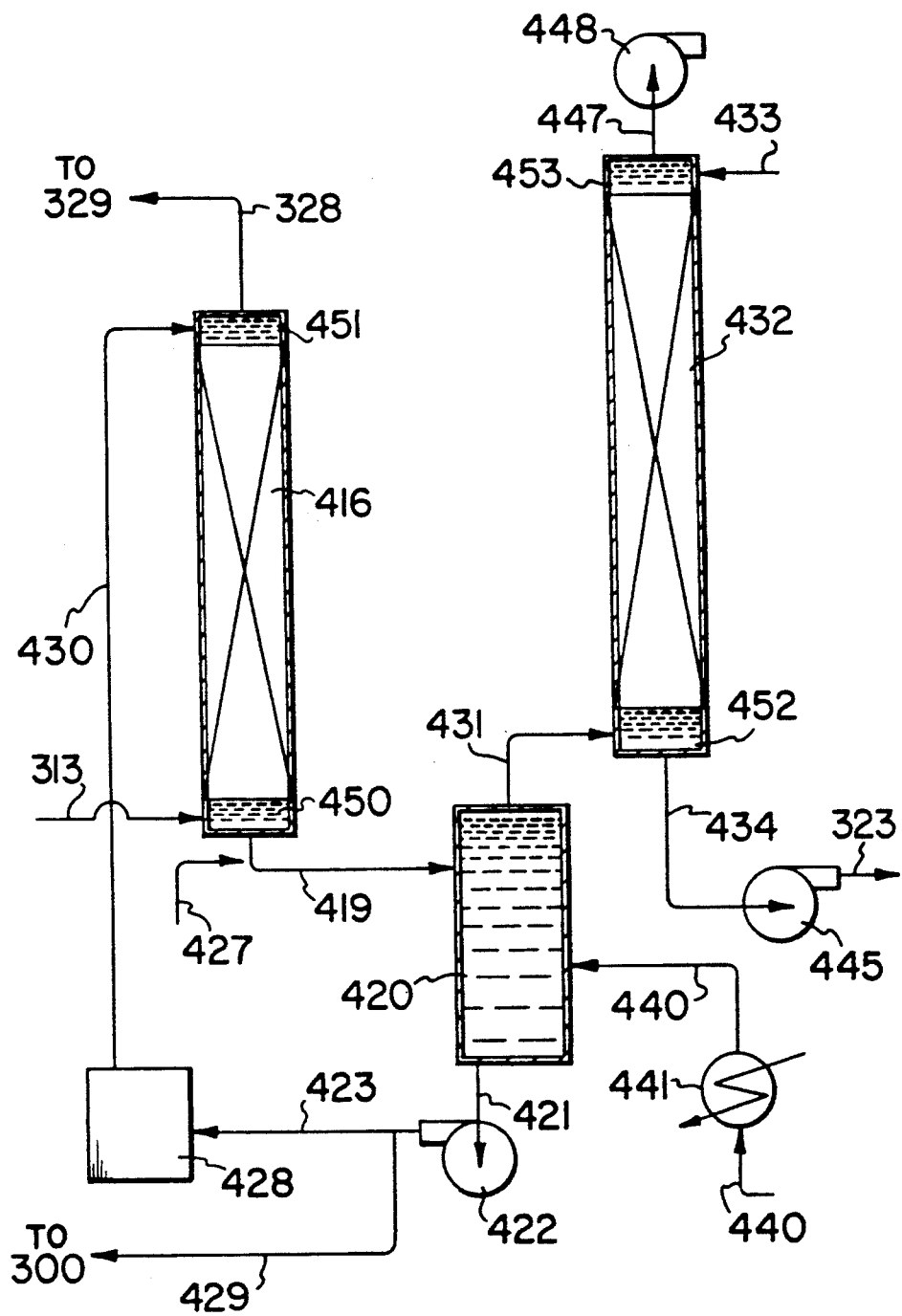
FIG. 4 is a schematic flow diagram of an alternative system for absorbing chlorine dioxide/separating chlorine in the process and system of FIG. 2.

Description of FIG. 4

FIG. 4 describes a second alternative embodiment of a chlorine separation and chlorine dioxide absorption system where acid absorption is used along with subsequent description by an air string.

The chlorine dioxide generator gases from chlorine dioxide generator 300 in line 313 is fed to the bottom 450 of a chlorine gas separating tower 416, which is packed with solid packing material, as well as a chlorine dioxide acidic liquid absorbent. Tower 416 is provided with the previously described tail gas outlet line 328, which leads to chlorine compressor 329. Tower 416 is also provided with a liquid outlet line 419 which leads to a receiver/stripper 420. The liquid outlet line 419 is provided with a make-up acid line 427 with or without chlorine reducing agent, e.g. hydrogen peroxide, or methanol (if acidity is high).

The receiver/stripper 420 is heated by way of heated air through duct 440, the air being heated by a heat exchanger 441 in the path of outflow from line 440. The receiver stripper 420 is provided with a recycle acid outlet line 421 leading to a recycle acid liquid pump 422. Pump 422 is connected via line 423 to a refrigeration/chiller system 428, and via a branch line 429 to the chlorine dioxide generator 300.

An acid feed line 430 leads from the refrigeration or chiller system 428 to the upper portion 451 of the tower 416.

The receiver/stripper 420 is also provided with a stripped gases outlet line 431 leading to the bottom 452 of a chlorine dioxide water absorber 432, which is fed with chill water through upper line 433 to the upper portion 453 of the absorber 432. The lower liquid discharging line 434 from absorber 432 leads to pump 445, which feeds to the previously described product outlet line 323.

The absorber 432 is vented via line 447 to blower 448 which leads either to a scrubber (not shown) or may be vented to the atmosphere.

Operation of Preferred Embodiments

Operation of FIG. 1

As seen in FIG. 1, the integrated process of this invention comprises a hydrochloric acid production zone, "A"; a chlorate electrolysis zone, "B"; and a chlorine dioxide production zone, "C".

Hydrochloric acid is synthesized by the combustion of chlorine make-up provided in line 1000 coupled with recycled chlorine provided in line 1400 with hydrogen gas provided in line 800. The hydrogen chloride product is scrubbed with water vapor provided in line 900 to produce hydrochloric acid which is passed as feed through line 1100 to the chlorine dioxide generator 300.

The chlorate electrolysis zone "B" comprises a flash evaporator zone (not shown) to recover water vapor passed through line 900 for scrubbing of the hydrogen chloride in hydrogen chloride synthesis reactor 100 or other water usage in this system. The electrolysis procedure in electrolyzer 200 comprises partly oxidizing original brine make-up provided in line 400 and recycled chlorides in recycled chlorate solution provided in line 700 to chlorate, which is removed through line 600.

Chlorine dioxide is generated in the chlorine dioxide synthesis generator 300 by reduction of chlorate employing hydrochloric acid fed through line 1100 as the reducing agent. Chlorine is a by-product in this reaction and the main part of this chlorine is recycled via line 1400 to the hydrogen chloride synthesis reactor 100. Chlorine dioxide gas produced in chlorine dioxide synthesis generator 300 is dissolved in chill water in line 1200 to provide an aqueous solution of chlorine dioxide as the finished product 1300.

Operation of the Embodiment of FIG. 2

Referring to FIG. 2, the above described three systems are identified with border lines and areas marked "A", "B", and "C" respectively.

The chlorate electrolytic system 200 may be any conventional electrolyzer system. Preferably, it is the system described in U.S. Pat. No. 4,101,406, issued to G.O. Westerlund on Jul. 18, 1978 (corresponding to Canadian Patent No 1,074,257 issued Mar. 25, 1980), the entire contents of which are herein incorporated by reference.

The chlorine dioxide generator 300 may be a conventional chlorine dioxide generator, or preferably is a novel chlorine dioxide generator referred to hereinabove.

The combustion chamber 100 may be either a conventional combustion chamber or may be a unique design as described above.

Referring to FIG. 2, the process proceeds as follows:

In the acid synthesis system, the combustion chamber 100 is fed with hydrogen cell gas feed through line 102, which is protected against flashback by the use of the fire arrester 103 interposed between feed lines 206 and 102. Condensate water is injected via line 121 to the hydrogen gas stream in line 102 to lower the combustion temperature to approximately 1,500° C. For start-up, compressed air is fed into the header 101 by means of pilot line 107. Recycle chlorine in lines 104,330 is continuously fed to the hydrogen chloride synthesis reactor when the temperature in the hydrogen chloride synthesis reactor, i.e. combustion chamber 100 is above about 600° C., along with make-up chlorine added through a branch line 105 on demand by way of an acid level controller (not shown) fitted to the hydrochloric acid receiver tank 118. A high voltage wire 108 provide sparks for ignition of the gases. Quenching condensate water is injected via lines 106 to the hydrogen chloride synthesis reactor, ie. combustion chamber 100, to lower the temperature at the lower section of the hydrogen chloride synthesis reactor i.e. combustion chamber 100. Such a temperature at the outlet 109 to the absorber 110 should be maintained below about 300° C. to prevent failure of the absorber 110. Gases and condensate are discharged via line ].12 to the inlet 13.3 of the hydrogen chloride scrubber 114. Scrubbing is effected using condensate water from lines 115,223 and/or deionized water fed via line 121. The hydrochloric acid is discharged by outlet line 117 to the hydrochloric acid receiving tank 118.

The chlorate electrolyzer 201 of the electrolytic cell 200 is integrated with the reactor vessel 202, with an inter-connecting piping system, i.e. outlet line 203, and re-entry line 204. The reactor vessel 202 is integrated with a header 205 which acts as degasifier. The excessive heat generated, or if steam is required during shut downs, is controlled by the immersed heat exchanger 207. Electrolyte liquid, i.e. containing chlorate and chloride is discharged via line 208 to pump 209 which provide all of the chlorate liquid flow stream requirements as follows: lines 214/307 to provide a feed stream to the chlorine dioxide generator 300; and the recycle stream via lines 210/211 to the flash tank 212, which also receives spent liquid via lines 213/310 from the chlorine dioxide generator 300. The mother liquor from the flash tank 212 is returned by line 216 to the reactor vessel 202.

The flash tank 212 is operated at a pressure which is lower than barometric pressure by connecting it to the suction side 328 of chlorine compressor 329 via lines 331,220. The demister 217 in the flash tank 212 minimizes the carry-over of salts by the discharge line 218 to the absorber 219 and from the absorber 219 into the condensate receiver tank 221. The flow of liquid to, or flow of vapour from, the flash tank 212 is regulated by the level controller (not shown) for header 205 of the reactor vessel 202. A higher level would require a larger flow rate.

The novel chlorine dioxide system synthesis generator 300 referred to above receives hydrochloric acid via lines 119,306 which is fed to the bottom of chlorine dioxide generator 300. It is preferably discharged into an intermix reagents chamber with temperature cooling control provided by means of heat exchanger 301. The intermix chamber preferably is fed with the hydrochloric acid through multi-capillary tubes to provide a high velocity discharge e.g. about 2 meters/second. Although the reactions to produce chlorine dioxide and chlorine respectively are endothermic, if the temperatures of the reagents are too high, and since the intermix liquid is very high in acidity, a reaction to produce chlorine would preferentially occur with resulting lower efficiency. Higher temperatures for the liquid composite would be desired when the hydrochloric acid has been intermixed with generator liquid to drive the reaction at higher rates. The chlorate feed through lines 214/307 is therefore admitted at a somewhat higher vertical level and adds heat to the mixture. The liquid in the chlorine dioxide generator 300 may be further heated indirectly by heat exchanger 302 as it flows through the chlorine dioxide generator 300. The heat input is preferably with chlorate solution derived from the reaction vessel 202. At the high temperature zone of the chlorine dioxide generator 300, a low pressure de-superheated steam heat exchanger 303 provides the required heat to maintain liquid at close to boiling temperature at the applicable operating pressure. The liquid level in the upper degasifying zone controls the discharge flow through outline lines 310/213 of "spent" liquid from the chlorine dioxide generator 300, or may be controlled by flash evaporator 212, having the discharge line 216 at the desired elevation on the side of the flash evaporator 212.

The degasifying zone includes a heat exchanger 304 for lowering the temperature in this zone to minimize the potential for the decomposition of chlorine dioxide. The top gas zone of the chlorine dioxide generator 300, includes an integrated cooling/condensing system 308 which preferably should employ chill cooling water via inlet line 312 with cooling water discharge via line 311 leading to the adjacent lower cooling heat exchanger 304. The gas zone has provision for dilution using recycled chlorine via recycle line 314. It also has a pressure relief system 332.

The effluent from the gas zone of the chlorine dioxide generator 300 is led by pipe line 313 to the absorber system shown by block in area D. Tail gases are discharged through discharge line 328. These tail gases, which are mainly chlorine gas, are led to the vacuum leg of the chlorine compressor 329.

The compressed chlorine gas is pumped out through line 330 to line 104 as feed from the hydrogen chloride synthesis. An optional branch line 314 is used to provide a chlorine gaseous both in the upper gas zone of the chlorine dioxide generator 300, if desired.

Operation of the Embodiment of FIG. 3

If the alternative embodiment of FIG. 3 is used as the chlorine separation and chlorine dioxide absorption system where a small amount of air is used for stripping, the effluent from the gas zone of the chlorine dioxide generator 30 is led by pipe line 313 to the inlet of the aborber system 316. The effluent feed via line 313 enters the bottom 315 of the absorber column 316 with the lower section 317 disposed below the entry of stripped gases via line 325 from barometric leg liquid column 320. The gases in the absorber 316 are thus intermixed with the stripped gases from line 325, derived from barometric leg liquid column 320. The purpose of this mixing is to lower the chlorine content in the chlorine dioxide product solution.

The gases in both the upper zone 318 and the lower zone 317 of the absorber 316 are scrubbed by counter current flow with downwardly flowing chill water admitted via line 326. A typical absorber 316 should recover 99+ % of the chlorine dioxide. The vertical height of the absorber 316 should be calculated to provide for this recovery. The demister 327 minimizes carry-over of chlorine dioxide solution into the chlorine compressor 329 by the above described tail gas line 328.

The product containing near saturated chlorine dioxide water solution passes via line 321 to pump 322 where it is pumped via the above described line 323 to an insulated storage tank (not shown).

Operation of the Embodiment of FIG. 4

If the alternative embodiment of FIG. 4 is used as the chlorine separation and chlorine dioxide absorption system where acid absorption is used along with subsequent desorption by an air strip, the effluent gases, i.e. chlorine dioxide and chlorine produced in the chlorine dioxide generator 300 are fed via the above-described line 313 to the separating tower 416. The separating tower is filled with conventional packing, i.e. Burl saddles or Raschig rings. The chlorine dioxide acidic absorbing liquid, i.e. hydrochloride acid, is fed to the top of separating tower 416 via line 430 at a concentration of about 3 to about 30 g/L HCl at a temperature preferably of about 2° C.

The acidic liquid containing absorbed chlorine dioxide, typically about 12 to about 14 g/L $ClO_2$ and at a temperature of about 3° C., is fed via line 419 to a receiver/stripper 420. Line 419 is fed with make-up of concentrated hydrochloric acid, with or without chlorine reducing agent, e.g. hydrogen peroxide or methanol (if acidity is high), typically at about 37%, via line 427. In receiver/stripper 420, the acid/chlorine dioxide solution is treated, via heated air through duct 440, to strip the chlorine dioxide gas therefrom. The receiver/stripper 420 also acts as a barometric leg because of the absolute pressure in the separating tower 416.

The stripped gases, containing air and chlorine dioxide with only a small amount of chlorine, or essentially no chlorine if chlorine reducing agent is added to the receiver 420, is fed via line 431 to lower end of an absorber 432. Here the chlorine dioxide is absorbed in chill water admitted through line 433. The tail gases, mainly air are removed via line 447 to blower 448 from where it is either vented to atmosphere or sent to a scrubber (not shown).

The aqueous solution of chlorine dioxide is removed from absorber 433 via line 434 to pump 446 which pumps the product through the above-described line 323. The chlorine dioxide solution typically has a $ClO_2:Cl_2$ ratio of greater then about 16, i.e. if no chlorine reducing agent is employed; otherwise it is essentially free of chlorine.

The tail gases, mainly chlorine gas, are vented from tower 416 via line 428, which leads to the previously described chlorine compressor 329.

The stripped acidic liquid in receiver/stripper 420, and which typically contains about 2 to about 5 g/L chlorine dioxide at about 25° C. to about 55° C. is discharged via line 421 to recycle acid liquid pump 422, by means of which part of the liquid is pumped to refrigerator/chiller 428 and part of the liquid is recycled to the chlorine dioxide generator 300. The flow to chlorine dioxide generator 300 is controlled by means of a level controller (not shown) in the receiver/stripper 420.

Acidic liquid absorber, i.e. hydrochloric acid, is fed from refrigerator/chiller 428 via line 430.

Examples of the Invention

The following are examples of this invention.

EXAMPLES A-E

A chlorine dioxide system comprising three 50 millimetres diameter, 0.91 meter high glass columns were segregated by screens of 2 millimetre openings, and operated at temperatures of 40° C. for the lowest elevation zone, 80° C. for the adjacent elevated zone and 100° C. for the top zone, which was the combined degasifier and gas zone. Feed liquid was pre-mixed, i.e. aqueous chlorate solution and 30% hydrochloric acid, in a tee at the bottom. The electrolytic system comprised a multicell electrolyzer and reactor tank having a volume based on 12 ampere hours per litre electrolyte. The cells were operated at a current density of 1500 amperes per square meter; 300 amperes with three cells in series. The temperature of the electrolytic system was 80° C. The level was maintained constant by taking a small stream to a glass boiler operated under vacuum from a water ejector. The hydrogen chloride synthesis was by an open hearth, 25 millimetre diameter, 0.5 meter long, quartz chamber operated at above 650° C. Deionized water was employed for scrubbing gases from the combustion chamber. The flows was set at equilibrium rate of 34 grams/hour of $ClO_3^-$ depleted.

Results of five trials were as follows:

|  | TRIAL | | | | |
| --- | --- | --- | --- | --- | --- |
|  | A | B | C | D | E |
| FEED LIQUID TO GENERATOR; g/L | | | | | |
| $Li^+$ | 0 | 42 | 70 | 87 | 30 |
| $Na^+$ | 140 | 1 | 1 | 1 | 50 |
| $ClO_3^-$ | 361 | 361 | 600 | 800 | 400 |
| $Cl^-$ (excluding acid) | 61 | 61 | 100 | 100 | 60 |
| HCl | 52 | 52 | 135 | 110 | 82 |
| $Cr_2O_7^{-2}$ | 2 | 2 | 2 | 2 | 2 |
| LIQUID DIS- | | | | | |

-continued

| | TRIAL | | | | |
|---|---|---|---|---|---|
| | A | B | C | D | E |
| CHARGED; g/L | | | | | |
| $ClO_3^-$ | 314 | 314 | 450 | 700 | 300 |
| EFFICIENCY | | | | | |
| $\Sigma$ ($ClO_2$); % | 90 | 90 | 96 | 98 | 92 |
| CONSUMPTIONS/ | | | | | |
| kG $ClO_2$ | | | | | |
| Steam; kG | 7 | 7 | 4 | 6 | 6 |
| El-power; kWh | 8.4 | 8.3 | 7.4 | 7.6 | 8.3 |

The results above show significant benefits when lithium is employed as the alkali metal in the electrolyte (recycled chlorate/chloride water solution). The improved electrical power consumption reflects the lower cell voltage and improved chlorine dioxide generating efficiency. The mixture, lithium, and sodium ions, of alkali metals in the electrolyte gave improved performance with higher lithium ion ratios.

The anode coating showed a longer performance when using lithium compared to when using sodium as the alkali metal in the electrolyte under accelerated test conditions.

EXAMPLE F

In another example, it was found that approximately one third of the excess heat generated in the electrolytic system can be effectively utilized in the generator for raising the temperature of generator liquid. For a conventional sodium chlorate solution the heat capacity is about 0.7 kcal/kG, ° C. The heat is recovered by feeding high temperature chlorate solution into the reacting zone of chlorine dioxide generator. The stripped gases have a lower chlorine dioxide to chlorine ratio compared the ratio of the solution from the absorber. By re-absorbing chlorine dioxide in the upper part of the absorber tower, the chlorine will be recovered in the tail gases fed to the chlorine compressor.

EXAMPLE G

In still another example, it was found that further amounts of heat from the chlorate solution are utilized by feeding the chlorate to a flash evaporator under low absolute pressure, less than 200 mm Hg. A typical material balance for water showed a requirement of evaporating up to about 2 tonnes condensate/tonne chlorine dioxide (which depends on strength of acid used and the efficiency of generation). This represents approximately 25% of the total excess heat in the electrolytic system and no penalty in steam consumption.

EXAMPLE H

In still another example, it was found that a substantial amount of chlorine can be recovered by air stripping the chlorine dioxide in the barometric leg of the chlorine dioxide absorber.

In another example, it was found that approximately one third of the excess heat generated in the electrolytic system can be effectively utilized in the generator for raising the temperature of generator liquid, For a conventional sodium chlorate solution the heat capacity ms about 0.7 kcal/kG, ° C. The heat is recovered by feeding high temperature chlorate solution into the reacting zone of chlorine dioxide generator. The stripped gases have a lower chlorine dioxide to chlorine ratio compared the ratio of the solution from the absorber. By re-absorbing chlorine dioxide in the upper part of the absorber tower, the chlorine will be recovered in the tail gases fed to the chlorine compressor. The amount of air is limited by the excess hydrogen at the hydrogen chloride synthesis and the allowable reduction in the chlorine dioxide solution strength. The air would typically be less than about 170 kg/tonne chlorine dioxide.

EXAMPLE I

In still another example, it was found that the typical combustion temperature, when including air from the stripper, is up to about 2800° C. By injecting and distributing water vapor for lowering to the desired temperature in the combustion zone and thereafter, in amounts up to about 2 tons condensate/tons chlorine dioxide, the temperature is quenched to less than about 300° C. This water, on condensating with hydrogen chloride gas, becomes the hydrochloric acid solution.

As was made clear hereinbefore, increasing the production of chlorine dioxide has heretofore been achieved by decreasing the concentration of chlorate ions, thereby increasing the concentration of chloride ions. Nevertheless, if the concentration of chloride ions increases beyond a certain point, salt encrustation within the chloride dioxide generator occurs with problems arising with respect to slurry handling, maintenance, efficiency and down-time for cleaning.

It has now also been found, contrary to the teachings of the patents referred to above in the introduction, that it is possible to maintain a higher concentration of chloride ions and thereby to increase the efficiency of production system of chlorine dioxide if the alkali metal ion used is lithium, and accordingly lithium is the preferred alkali metal. It has, thus, been found that with the closed loop recycling system of the present invention there is almost no loss of lithium ions. The lithium ions may be provided by lithium chloride, lithium hydroxide, lithium hypochlorite or lithium carbonate.

In any event, however, even if sodium is the alkali metal, significant improvements in efficiency of production of chlorine dioxide are achieved if the chlorate concentration is above about 400 g/L and the chloride concentration is above about 90 g/L.

In respect of the operation in the electrolysis zone, it has been found that lithium ions are more conductive than sodium ions, and so a lower voltage is required for the electrolysis. The anode coating is also believed to have a longer life cycle since the electrolytes have a lower oxygen overvoltage, providing for longer anode coating performance with higher overvoltage coatings. Because of the greater solubility of the lithium ions, a higher concentration of chlorate can be achieved, which increases the efficiency of production of chlorine dioxide.

In general terms, the procedure of this invention may be summarized as follows:

The chlorate process cell gases are used as feed for the hydrogen chloride combustion chamber. While chlorate cell gases are a preferred source of hydrogen, the hydrogen may come from other sources, e.g. pure hydrogen or from a chlorine-alkali cell. Alternatively, a portion of hydrochloric acid, equal to the chlorine make-up, may be supplied to the system. The products of the combustion chamber are scrubbed and cooled for recovery of acid which is stored in the storage tank. Thus, condensed water with the hydrogen chloride is discharged into the tank. Uncondensed or undissolved gases will be discharged to atmosphere, or, if available, into a lime kiln. They may alternatively pass upwardly through a second scrubber using caustic or lime water as a scrubbing agent. The density of the hydrochloric acid is regulated by the chlorine addition, but it is noted that a minimum flow of water is required, which flow is proportional to the production of HCl and the gas flow. The makeup of chlorine is controlled by the liquor level in the hydrochloric acid storage tank.

The aqueous hydrochloric acid solution is pumped into the bottom of the chlorine dioxide generator, flow being controlled by a flow control valve or by a metering pump. Also fed to the chlorine dioxide generator is a chlorate solution which is fed to the electrolytic cell as a weaker chlorate solution after it has been reacted in the chlorine dioxide generator. Temperature control and a liquid level control are used in the chlorine dioxide generator. Gases leave the chlorine dioxide generator by ducting to the chlorine dioxide absorption tower.

Water is added to the chlorine dioxide absorption tower to maintain the desired concentration of chlorine dioxide in the chlorine dioxide solution. Gases leaving the chlorine dioxide absorption tower are mainly chlorine, and air saturated on water vapour.

A blower, a diaphragm pump, a compressor, or an ejector system, can alternatively provide the desired pressure throughout the system.

The process system requires a make-up of chlorine (or acid) regulated by the requirement of reducing agent which is, as per the level controller provided in the hydrochloric acid storage tank. The amount of make-up chlorine is theoretically calculated by the following overall summarized reaction for the present invention including the electrolytic production of chlorates:

$$4H_2O + Cl_2 + 12 \text{ Faradays} \rightarrow 2ClO_2 + 4H_2$$

The system yields an efficiency of 96% or higher. It is thus noted that the only by-product is hydrogen, e.g. if the cogenerated chlorine is separated and recycled and the soluble chlorine reduced and recycled. The process yields, as the main product, an aqueous chlorine dioxide solution.

It has been found that employing high chlorate concentrations in the chlorine dioxide generation liquid, a high yield of chlorine dioxide is favoured from the chlorate reduced in the generator. The high concentrations of chlorate, is compared by reference to the conventional integrated processes which generally employs a sodium chlorate solution feed of 500, or less, grams/L (less than 400 g/L as chlorate ion). The actual sodium chlorate concentration in the generator liquid would be much lower due to dilution by acid addition and depletion of chlorate and reaction to water. The chlorate depleted, relative to feed, is typically about 30 to about 70% and yield of chlorine dioxide from the reduced chlorate varies from about 60 to about 100%.

Conventional processes have generally specified low chlorate ion concentration in the feed solutions and, thus, still lower in the generation liquid, because of limitations on the output from the sodium chlorate electrolytic system employed. Also, the convention low chlorate ion concentrations are due to the limitations of the solubility for the system $NaCl:NaClO_3:H_2O$. The conventional sodium chlorate feed solution contains about 90 to about 125 grams/liter of sodium chloride. This level of concentration is usually determined by the electrolytic system and by the sodium chloride crystallization equilibrium at various degrees of depletion of the chlorate (which produces additional sodium chloride).

Furthermore, apparently it has not been recognized that there are advantages of operating the chlorine dioxide generating system at high chlorate ion concentration.

It has been found according to the present invention that there is a significant improved sustained high yield, above about 96%, in the generation of the chlorine dioxide, which is due to employing high concentrations of chlorate ion, above about 500 grams/liter; generally the higher, the better. The process system described hereinafter provides for this high yield and improved economics compared to conventional integrated processes.

To achieve the object of high yield and favorable economics, the electrolytic system must be capable of providing the output of specified chlorate ion feed solution. One such system is described in U.S. Pat. No. 4,101,406 (Simplified Electrolytic System; Westerlund). Furthermore, because of the properties of the generation liquid, the desirability of utilizing heat values in the electrolyte solution, and the high yield effective temperature range for chlorine dioxide generation (about 50° to about 90° C.), the chlorate ion solution feed should be added "as is" to the generator without precooling. The depletion of chlorate ion is limited by the preferred high concentration of chlorate throughout the zones generating chlorine dioxide, (the preferred concentration being not less than 500 grams/liter). It is also limited by equilibrium of generator liquid solubility system which is saturated with respect to alkali metal chloride. The alkali metal concentration should be less than saturation, since otherwise, the generator conceivably can be plugged with salt crystals.

The generation of chlorine dioxide is facilitated by hydrochloric acid feed to the generator. The acid mixes with the generator liquid and, at the specified operating conditions, reacts with the chlorate ion to produce chlorine dioxide. The acid strength should be as strong as is practical and/or economical. Generally this is above about 30% and normally up to about 37% in water solution. This water adds to the water material balance of the liquid system and in practice is subsequently, for the most part, recovered by evaporation and recondensing. The temperature is at about 30° C. or less (higher temperature increase the partial pressure of the acid which makes for higher tails loss in the scrubber and also makes for a stronger reaction).

To achieve the high yield of chlorine dioxide from the reduction of chlorate ion, it is essential that the liquids intermix as homogeneously and as fast as possible. Reaction is almost instantaneously at the above specified conditions. If chlorate solution feed is at about 80° C., the temperature in the generator is likely above about 50° C., and the reaction rate will be moderate in activity. If the temperature is above about 60° C. at the intermixed liquid, the reaction will be strong. At above about 70° C., the reaction locally will be bordering on violent. If the liquids are essentially intermixed within a time of one second, the reaction favoring chlorine dioxide will occur. If the intermixing is prolonged, inefficiency by generation of chlorine will become significant and at the higher temperatures (above about 50° C.) the result would have drastic reduced yield (possibly for the duration of mixing could be as low as about 60% efficiency only).

The high rate of reaction is significant because of the high concentration of chlorate ion and the temperature of the generator liquid. This provides for as much as about 90% completion of reaction in less than about 10 minutes if the temperature is raised to about 80° C. Furthermore, stopping the acid feed at any one temperature typically stops the gas generation within time of about one minute. This provides for on/off operating control.

The preferred acid distribution means is an assembly of TEFLON polytetrafluoroethylene capillary tubing, about 1 mm inside diameter, operated at velocity of about 2 meter/second. The assembly distributes the acid over a large volume of generator liquid.

As an example of the high chlorate ion concentration generation of chlorine dioxide, a chlorate feed solution of about 800 grams/liter sodium chlorate and about 90 grams/liter sodium chloride (at a temperature of about 85° C.) was depleted in chlorate by about 20% by reaction with hydrochloric acid feed (at a temperature of about 22° C.) into generator mother liquid (zone volume ratio relative to acid feed=10) at a rate of about 2 meter/second. The mixed liquid reacting temperature was about 62° C., it was raised to about 85° C. over a time of about 5 minutes, about 90% of the acid feed was depleted in this time period. The sodium chlorate: sodium chloride ratio was about 4. The chlorine dioxide yield from chlorate averaged 97%.

In still another example, following the practice of the present invention, the alkali metal was lithium to provide still higher concentration of chlorate ion and to provide other benefits. Chlorate feed (about 70° C.) strength was about 1200 grams/L of lithium chlorate and about 100 grams/L of lithium chloride with acid feed (about 22° C.) equivalent to about 25% depletion of chlorate. The mixed liquid reacting temperature was about 50° C. It was raised over a time of about 5 minutes to about 85° C. Mother liquor lithium chlorate to lithium chloride was approximately 4. The average chlorine dioxide yield from chlorate was about 98%.

The generator liquid of the integrated chlorine dioxide process usually contains a small amount of dichromate from the chlorate feed solution. This appears to have no detrimental effect on the yield of the chlorine dioxide.

Although the integrated process produces chlorine dioxide from chlorate at high yield, the reaction also produces chlorine. The main part of this chlorine is recovered within the system by recycle to hydrochloric acid synthesis. A smaller part is absorbed in the water with the product. Recently some pulp mills specify chlorine dioxide product to be essentially chlorine free. This can be achieved by innovated designs for absorption of chlorine dioxide and/or by additions of reactants for chlorine destruction. The high yield integrated chlorine dioxide process produces the minimum chlorine, namely about 0.65 tons of chlorine (or less) per tons of chlorine dioxide in the generator gases. This high yield chlorine dioxide process provides for an economic feasibility of producing chlorine dioxide essentially free of chlorine by employing a chlorine reducing agent in the generator for this purpose. The uniquely suitable agent is methanol which is well known as a reducing agent in the Solvay process and other modified processes based on high acidity employing sulphuric acid in the mother liquor of the chlorine dioxide generator liquid. The preferred procedure for the integrated process is adding an equivalent amount to chlorine of methanol to the hydrochloric acid feed.

The methanol will react with chlorine as represented by the following reaction:

$$CH_3OH + Cl_2 \rightarrow 2HCl + HCHO \text{ (formaldehyde)}$$

and/or by the following reaction:

$$2HClO + CH_3OH \rightarrow 2HCl + H_2O + HCOOH \text{ (formic acid)}$$

Part of the formic acid is decomposed by oxidizing to carbon dioxide and water:

$$HCOOH + O \rightarrow CO_2 + H_2O$$

Methanol reacts with dichromate, if present, to yield a precipitate in the generator liquid. The integrated process recovers the chlorine as hydrochloric acid in situ in the chlorine dioxide generator. Although, the destruct of the chlorine in the generator represents an additional manufacturing cost, the improved grade of chlorine dioxide, with essentially no chlorine and no by-products in the product, is likely to be specified in future plants.

As pointed out in reference to FIG. 3, an alternative to chlorine destruct in the generator may be achieved as follows: generator gases may be scrubbed with chill weak hydrogen chloride water solution (about 3 to about 30 grams HCl/L) for absorption of chlorine dioxide. Chlorine solubility is suppressed in this solution; the amount of chlorine disolved can be reduced to HCl by addition of hydrogen peroxide or methanol.

The chlorine dioxide is then desorbed by heating and air stripping. The ratio of chlorine dioxide to chlorine in the stripped gas is typically about 16:1, if no chlorine reducing agent is employed. Further improvements to "zero" chlorine is probably best achieved adding a chlorine destruct agent to the product acidic absorbing liquid.

CONCLUSION

The integrated process of this invention provides the following advantages:

An integrated process is provided which produces chlorine dioxide economically at higher efficiency with product of high chlorine dioxide to chlorine ratio.

Economics are realized by high rate of reaction, heat values realized from chlorate feed solution, water balance by flash evaporation utilizing chlorine compressor for low absolute pressure, high chlorine recovery, and high efficiency in the chlorine dioxide generation and electrolytic system respectively.

High chlorate ion concentration is used as the driving force for chlorine dioxide generation as well as providing for lower acid residual and on/off generation with acid feed as control.

High rate of chlorate electrolyte recirculation is used to provide heat values available from electrolysis.

Flash evaporation is used for water balance utilizing low absolute pressure of the chlorine compressor.

Hydrochloric acid intermixed with chlorine dioxide generator liquid is provided by means of multi-capillary tubing with high velocity discharge for improved generating efficiency and to facilitate operating at a higher temperature in reacting zone.

The use of a hydrochloric acid synthesis system with water quenching for temperature control enables use of standard acid fire resistant brick construction of the hydrochloric acid combustion chamber and ceramic/plastic construction for the absorber.

The destruction of chlorine is achieved by methanol addition to the reactants of the chlorine dioxide generator.

The provision of a chlorine separating system which employs weak hydrogen chloride water solution for suppressing the solubility of chlorine, may also add a chlorine reducing agent for zero chlorine, and the subsequent desorption step for the recovery of chlorine dioxide.

The provision of a limited air stripping (limited to less than about 10% chlorine dioxide stripped) system, for lowering chlorine in the product, stripped gases recovered are sent to an elevated point on the chlorine dioxide absorbing tower or, used for dilution of gases in the chlorine dioxide generated by recycling the gases to the chlorine dioxide generator.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A continuous process for the production of chlorine dioxide which comprises: (a) effecting electrolysis of an aqueous solution of an alkali metal chloride, in an electrolysis zone, to form an aqueous solution of said alkali metal chlorate having a chlorate ion concentration of over about 400 g/L, a chloride ion concentration of over about 90 g/L, gaseous hydrogen, and water vapor; (b) conducting said produced gaseous hydrogen and said water vapor to a hydrogen chloride synthesis zone where they are reacted with chlorine gas which may be recycled or make-up chlorine gas, and withdrawing an aqueous solution of hydrochloric acid therefrom; (c) withdrawing an aqueous solution of said alkali metal chlorate and alkali metal chloride at an alkali metal chlorate ion concentration of over about 400 g/L and an alkali metal chloride concentration of over about 90 g/L from said electrolysis zone, and conducting said withdrawn aqueous solution along with an aqueous solution of hydrochloric acid from said hydrogen chloride synthesis zone to a chlorine dioxide synthesis zone, where reaction takes place to produce chlorine dioxide and by-product chlorine; (d) withdrawing a mixture of chlorine dioxide and by-product gaseous chlorine from said chlorine dioxide synthesis zone; (e) recovering chlorine dioxide from said mixture; (f) recycling by-product gaseous chlorine from said chlorine dioxide synthesis zone to said hydrogen chloride synthesis zone for reaction with hydrogen gas and water to form hydrochloric acid; and (g) recycling unreacted aqueous solution of alkali metal chlorate from said chlorine dioxide synthesis zone to said electrolysis zone.

2. The continuous process of claim 1 including the step of: adding a reducing agent to said chlorine dioxide synthesis zone; thereby to provide an essentially chlorine-free chlorine dioxide product.

3. The continuous process of claim 1 including the additional step of: withdrawing off-gasses via an auxiliary line of a scrub system of said chlorine dioxide synthesis zone to said chlorine dioxide synthesis zone; scrubbing chlorine dioxide gas with weak hydrochloric acid, thereby to absorb chlorine dioxide and, thus, to separate chlorine therefrom for recycling; reducing soluble chlorine by the addition of a reducing agent, thereby forming chloride ions for recovery; and recycling unreacted aqueous solution of said alkali metal chlorate with alkali metal chlorides therein to said electrolysis zone; thereby to provide an essentially chlorine-free chlorine dioxide product.

4. The continuous process of claim 1 including the step of flash evaporating liquid in said electrolysis zone, thereby to provide water for conducting to said hydrogen chloride synthesis zone.

5. The continuous process of claim 1 including the step of using heat values in said alkali metal chlorate solution as heat for carrying out the reaction in said chlorine dioxide synthesis zone by limiting depletion of chlorate ions to less than about 30%, thus providing for higher feed rates of chlorate solution with inherent heat values of solution.

6. The continuous process of claim 5 wherein depletion of chlorate ions is limited to less than about 15%.

7. The continuous process of claim 1 wherein said alkali metal is sodium.

8. The continuous process of claim 1 wherein said alkali metal is lithium, and wherein the chlorate ion concentration is in the range of about 400 to about 1,200 g/L.

9. The continuous process in claim 1 including the step of intermixing of reagents in said chlorine dioxide synthesis zone is achieved by a high velocity discharge of about 2 meters/second from multi-capillary inlet zones feeding said hydrochloric acid.

10. The continuous process of claim 1 including the step of: adding a reducing agent selected from the group consisting of methanol, hydrogen peroxide, urea, acetic acid and ammonia to said chlorine dioxide synthesis zone for the purpose of lowering by-product chlorine gas generation, thereby to provide zero destruct.

11. The continuous process of claim 1 including the steps of: using the chlorine dioxide synthesis zone gases as weak hydrochloric acid scrub for chlorine dioxide absorption with chlorine solubility is suppressed by the hydrogen chloride; including a subsequent desorption step for recovery of chlorine dioxide by air stripping at elevated temperature; and then recooling said acid solution before recycling for a new scrub cycle.

12. The continuous process of claim 1 including the step of scrubbing generator gases with dilute chilled hydrochloric acid, of about 3 to about 30 g HCl/L for absorption of chlorine dioxide.

13. The continuous process of claim 1 including the step of air stripping the absorber liquid to improve the chlorine dioxide to chlorine ratio and to provide stripped gases, and then discharging stripped gases to an elevated point in the chlorine dioxide synthesis zone.

14. The continuous process of claim 1 including the step of air stripping the absorber liquid to improve the chlorine dioxide to chlorine ratio and to provide stripped gases, and then recycling stripped gases to said chlorine dioxide synthesis zone for dilution of generator gases.

15. The continuous process of claim 1 wherein the concentration of said aqueous solution of hydrogen chloride is up to about 37% by weight.

16. The continuous process of claim 15 wherein the concentration of said aqueous solution of hydrogen chloride is from about 30% to about 37% by weight.

17. The continuous process of claim 1 wherein the temperature of said aqueous solution of hydrochloric acid fed to said chlorine dioxide synthesis zone is a maximum of about 30° C.

18. The continuous process of claim 1 wherein the reaction between said aqueous solution containing alkali metal chlorate and said aqueous solution of hydrogen chloride takes place at a gradually increasing temperature in an upwardly flowing chlorine dioxide synthesis zone from a lower temperature of about 50° C. to an upper temperature of about 80° C.

19. The continuous process of claim 1 wherein said aqueous solution containing an alkali metal chlorate and said aqueous solution of hydrogen chloride are intermixed within a time of about one second.

20. The continuous process of claim 1 wherein said process is carried out for a 90% completion in about 10 minutes at a maximum temperature of about 80° C.

21. The continuous process of claim 1 wherein said aqueous feed solution contains about 800 g/L sodium chlorate and about 90 g/L sodium chloride at an infeed temperature of about 85° C.; wherein said aqueous solution of hydrogen chloride has a concentration of about 37% by weight at an infeed temperature of about 22° C.; wherein the intermix rate at a zone volume ratio of chlorate feed to hydrogen chloride feed is about 10, the rate of feed being about 2 m/sec; wherein the reaction temperature is initially about 62° C. and is raised to about 85° C. over a period of time of about 5 minutes; thereby to provide about a 90% depletion of the hydrogen chloride feed, a ratio of sodium chlorate to sodium chloride of about 4 and a chlorine dioxide yield of about 97%.

22. The continuous process of claim 1 wherein: said aqueous feed solution contains about 1200 g/L lithium chlorate and about 100 g/L lithium chloride at an infeed temperature of about 70° C.; wherein said aqueous solution of hydrogen chloride has a concentration of about 37% by weight at an infeed temperature of about 22° C.; wherein the intermix rate at a zone volume ratio of chlorate feed to hydrogen chloride feed is about 10, the rate of feed being about 2 meters/second; wherein the reaction temperature was initially about 50° C. and was raised to about 85° C. over a period of time of about 5 minutes; thereby to provide about a 90% depletion of the hydrogen chloride feed, a ratio of lithium chlorate to lithium chloride of about 4 and a chlorine dioxide yield of about 98%.

23. The continuous process of claim 1 wherein said alkali metal chlorate and said hydrochloric acid are reacted to generate chlorine dioxide and chlorine in accordance with the equation:

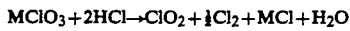
$$MClO_3 + 2HCl \rightarrow ClO_2 + \tfrac{1}{2}Cl_2 + MCl + H_2O$$

where M is an alkali metal; and including the steps of: separating gaseous chlorine from gaseous chlorine dioxide; dissolving said separated chlorine dioxide in chilled water or in chilled diluted hydrochloric acid; and including the step of withdrawing aqueous solution of chlorine dioxide from said chlorine separating zone.

24. The continuous process of claim 23 wherein the concentration of chlorate ions is about 600 to about 1200 g/L.

25. The continuous process of claim 23 wherein said alkali metal is sodium.

26. The continuous process of claim 23 wherein said alkali metal is lithium.

27. The continuous process of claim 23 wherein the concentration of chlorate ions in said spent aqueous solution containing alkali metal chlorate is about 30% less than the concentration in the fresh aqueous solution containing said alkali metal chlorate.

28. The continuous process of claim 23 wherein the concentration of said chlorate ions is about 20% less.

29. The continuous process of claim 23 including the step of intermixing said reagents in said chlorine dioxide synthesis zone by means of a high velocity discharge from multi-capillary inlet zones feeding said hydrochloric acid.

30. The continuous process of claim 29 wherein the velocity of said high velocity discharge is about 2 meters/second.

31. The continuous process of claim 23 the step of: adding a reducing agent selected from the group consisting of methanol, hydrogen peroxide, urea, acetic acid, and ammonia to said chlorine dioxide synthesis zone for lowering by-product chlorine gas generation, thereby to provide zero destruct.

32. The continuous process of claim 23 including the step of: air stripping the absorber liquid to improve the chlorine dioxide: chlorine ratio and to provide stripped gases; and then discharging stripped gases to an elevated point in the chlorine dioxide synthesis zone.

33. The continuous process of claim 23 including the steps of: air stripping the absorber liquid to improve the chlorine dioxide: chlorine ratio and to provide stripped gases; and then recycling the stripped gases to said chlorine dioxide synthesis zone for dilution of generator gases.

34. The continuous process of claim 23 wherein the concentration of said aqueous solution of hydrogen chloride is up to about 37% by weight.

35. The continuous process of claim 34 wherein the concentration of said aqueous solution of hydrogen chloride is about 30% to about 37% by weight.

36. The continuous process of claim 23 wherein the temperature of said aqueous solution of hydrochloric acid which is fed to said chlorine dioxide synthesis zone is a maximum of about 30° C.

37. The continuous process of claim 23 wherein the reaction between said aqueous solution containing alkali metal chlorate and said aqueous solution of hydrogen chloride takes place at a gradually increasing temperature in an upwardly flowing chlorine dioxide synthesis zone from a lower temperature of about 50° C. to an upper temperature of about 80 ° C.

38. The continuous process of claim 23 wherein said aqueous solution containing an alkali metal chlorate and said aqueous solution of hydrogen chloride are intermixed within a time of about one second.

39. The continuous process of claim 1 including the steps of: dividing said withdrawn aqueous solution of said alkali metal chlorate and alkide metal chloride into two liquor streams, one liquor stream being conveyed to said chlorine dioxide synthesis zone, and the other liquor stream is passed to a flash evaporating zone, where it is mixed with a liquid solution comprising an alkali metal chlorate and an alkali metal chloride which is in part a chlorate-ion-depleted aqueous solution containing over about 90 g/L of alkali metal chlorides, in part residual hydrochloric acid, and in part fresh alkali metal chlorate and alkali metal chloride solution of over 400 g/L of alkali metal chlorates and over about 90 g/L of alkali metal chlorides; conducting said liquor from said flash evaporating zone to said chlorine dioxide synthesis zone; demisting a vapor produced in said flash evaporation zone in an upper demisting zone of said flash zone; passing an outlet from said demisting zone to a condensing zone; conducting condensate from said condensing zone to an acid scrubbing zone of said hydrogen chloride synthesis zone; and passing vapors from said condensing zone to a gas compression zone.

40. The continuous process of claim 39 including the step of: heating the products of electrolysis in said reaction zone in a heat exchanger zone within said reaction zone.

41. The continuous process of claim 40 wherein the temperature of heating within said reaction zone is about 85° C.

42. The continuous process of claim 40 wherein gases collected in a header/degasification zone of said reaction zone are substantially gaseous hydrogen.

43. The continuous process of claim 39 including the step of: temporarily storing condensate from said condensing zone in a condensate storage zone.

44. The continuous process of claim 39 including the step of: conducting vapors from said gas compression zone to said hydrogen chloride combustion zone.

45. The continuous process of claim 39 including the step of: carrying out a degasifying reaction in said reaction zone.

46. The continuous process of claim 39 including the step of: positively controlling the temperature in said reaction zone.

47. The continuous method of claim 39 including the step of: mixing spent liquid from said chlorine dioxide generator with said conducted liquor in said flash zone.

48. The continuous process of claim 1 wherein said chlorine dioxide synthesis comprises: gradually heating said aqueous solution containing alkali metal chlorates and alkali metal chlorides and said aqueous hydrochloric acid as they pass upwardly through said chlorine dioxide synthesis zone, thereby to produce chlorine dioxide gas and chlorine gas; cooling said chlorine dioxide and chlorine gases and conducting said cooled chlorine dioxide and chlorine gases to a lower region of a gas separation zone; conducting aqueous hydrochloric acid to an upper region of said gas separation zone where it passes downwardly countercurrent to an upward flow of said cooled chlorine dioxide and chlorine gases, thereby preferentially to dissolve gaseous chlorine dioxide; withdrawing gaseous effluent from said gas separation zone for conducting to said hydrogen chloride combustion zone; passing liquid effluent from said gas separation zone along with make-up aqueous hydrochloric acid, with or without a chlorine reducing agent selected from a group consisting of hydrogen peroxide and methanol at high acidity to a receiving/stripping zone where it is subjected to the action of heated air admitted to a lower region of said receiving/stripping zone, thereby to strip chlorine dioxide gas from said hydrochloric acid solution of chlorine dioxide gas; withdrawing liquid effluent from said receiving/stripping zone and dividing said liquid into two streams, feeding one of said streams to a lower region of said chlorine dioxide synthesis zone along with aqueous hydrochloric acid also fed thereto and feeding a second one of said streams to a refrigeration zone for conducting of chilled aqueous hydrochloric acid to an upper region of said gas separation zone; withdrawing gaseous effluent from said receiving/stripping zone and conducting said withdrawn gaseous effluent to a lower region of a chlorine dioxide absorption zone; conducting chill water to an upper region of said chlorine dioxide absorption zone where it flows downwardly countercurrent to upwardly flowing chlorine dioxide gas; withdrawing aqueous chlorine dioxide product from said lower region of said chlorine dioxide absorption zone; and venting gases from said upper region of said chlorine dioxide absorption zone.

49. The continuous process of claim 48 including the step of: conducting said hydrogen gas through a fire arresting zone prior to conducting said hydrogen gas to a header zone, thereby to protect against flash back.

50. The continuous process of claim 49 including the step of: mixing initial make-up hydrogen gas with said hydrogen gas from said electrolysis zone to initiate said combustion reaction.

51. The continuous process of claim 49 including the step of: injecting water into said hydrogen stream to control the reaction temperature to below about 1500° C.

52. The continuous process of claim 49 including the step of: conducting said product hydrogen chloride gas through a condensation zone before it is fed to said hydrogen chloride scrubbing zone.

53. The continuous process of claim 48 including the step of: continuously feeding recycle chlorine gas from said chlorine dioxide synthesis to said hydrogen chloride combustion zone when said temperature in said hydrogen chloride combustion zone exceeds about 600° C.

54. The continuous process of claim 48 including the step of: maintaining the temperature at the outlet of said absorption zone below about 300° C.

55. The continuous process of claim 48 wherein said chill water includes aqueous condensate from said electrolysis zone.

56. The continuous process of claim 48 including the step of: temporarily storing said aqueous solution of hydrogen chloride in a holding zone prior to conducting said aqueous solution of hydrogen chloride to said chlorine dioxide synthesis zone.

57. The continuous process of claim 1 wherein said chlorine dioxide synthesis comprises: conducting aqueous hydrochloric acid from said hydrogen chloride combustion to a lower region of a chlorine dioxide synthesis zone; gradually heating said aqueous solution containing over about 400 g/L alkali metal chlorates and over about 90 g/L alkali metal chlorides and aqueous hydrochloric acid as it passes upwardly through said chlorine dioxide synthesis zone, thereby to produce chlorine dioxide gas and chlorine gas; cooling said chlorine dioxide and chlorine gases and conducting said cooled chlorine dioxide and chlorine gases to a lower region of an absorption zone; conducting chill water into an upper region of said absorption zone where it passes downwardly in a countercurrent direction to upwardly flowing said cooled chlorine dioxide and chlorine gases, thereby to dissolve said chlorine dioxide gas; conducting aqueous effluent from said absorption zone to a second contact zone where downwardly flowing aqueous effluent is contacted countercurrently with upwardly flowing stripping air which is fed to an upper region of said second contact zone; withdrawing aqueous chlorine dioxide product from a lower region of said second contact zone; withdrawing gaseous effluent from an upper region of said second contact zone; and withdrawing gaseous effluent from an upper region of said absorption zone for conducting to said hydrogen chloride combustion zone.

58. The continuous process of claim 57 wherein: the reaction temperature in said chlorine dioxide synthesis zone ranges from a lower temperature of about 40° C. to an upper temperature of about 90° C.; and wherein the temperature in an upper combined degasifier and gas zone is about 100° C.

59. The continuous process of claim 57 wherein the concentration of hydrochloric acid is about 30% to about 37% by weight.

60. The continuous process of claim 57 wherein the aqueous alkali metal chlorate/alkali metal chloride reaction liquor moves through a high velocity discharge from multi-capillary inlet zones.

61. The continuous process of claim 60 wherein the velocity of said high velocity discharge is about 2 meters/second.

62. The continuous process of claim 57 wherein said aqueous feed solution contains about 800 g/L sodium chlorate and about 90 g/L sodium chloride at an infeed temperature of about 85° C.; wherein said aqueous solution of hydrogen chloride has a concentrate of about 37% by weight at an infeed temperature of about 22° C.; wherein the intermix rate at a zone volume ratio of chlorate feed to hydrogen chloride feed is about 10, the rate of feed being about 2 m/sec; and wherein the reaction temperature is initially about 62° C. and is raised to about 85° C. over a period of time of about 5 minutes; thereby to provide about a 90% depletion of the hydrogen chloride feed, a ratio of sodium chlorate to sodium chloride of about 4 and a chlorine dioxide yield of about 97%.

63. The continuous process of claim 57 wherein said aqueous feed solution contains about 1200 g/L lithium chlorate and about 100 g/L lithium chloride at an infeed temperature of about 70° C.; wherein said aqueous solution of hydrogen chloride has a concentration of about 37% by weight at an infeed temperature of about 22° C.; wherein the intermix rate at a zone volume ratio of chlorate feed to hydrogen chloride feed is about 10, the rate of feed being about 2 m/sec; and wherein the reaction temperature is initially about 50° C. and is raised to about 85° C. over a period of time of about 5 minutes; thereby to provide about a 90° C. depletion of the hydrogen chloride feed, a ratio of lithium chlorate to lithium chloride of about 4 and a chlorine dioxide yield of about 98%.

64. The continuous process of claim 1 including the steps comprising: gradually heating said aqueous solution containing alkali metal chlorates and alkali metal chlorides and aqueous hydrochloric acid as it passes upwardly through said chlorine dioxide synthesis zone, thereby to produce chlorine dioxide gas and chlorine gas; cooling said chlorine dioxide and chlorine gases and conducting said cooled gases to a lower region of a chlorine dioxide and chlorine gas separation zone; conducting aqueous hydrochloric acid to an upper region of said gas separation zone where it passes downwardly countercurrent to upwardly flowing cooled gases, thereby to dissolve gaseous chlorine dioxide preferentially; withdrawing gaseous effluent from said gas separation zone for conducting to said hydrogen chloride combustion zone; passing liquid effluent from said gas separation zone along with make-up aqueous hydrochloric acid with or without chlorine reducing agents selected from the group consisting of methanol at a high acidity, hydrogen peroxide, urea, acetic acid, and ammonia, to a receiving/stripping zone where it is subjected to the action of heated air admitted to a lower region of said receiving/stripping zone to strip chlorine dioxide gas from said hydrochloric acid solution of chlorine dioxide gas; withdrawing liquid effluent from said receiving/stripping zone and dividing said liquid into two streams; feeding one of said streams to a lower region of said chlorine dioxide synthesis zone along with aqueous hydrochloric acid also fed thereto; feeding the other one of said streams to a refrigeration zone for conducting of chilled aqueous hydrochloric acid to an upper region of said gas separation zone; withdrawing gaseous effluent from said receiving/stripping zone; conducting said withdrawing gaseous effluent to a lower region of a chlorine dioxide absorption zone; conducting chill water to an upper region of said chlorine dioxide absorption zone where it flows downwardly countercurrent to upwardly flowing chlorine dioxide gas; withdrawing aqueous chlorine dioxide product from a said lower region of said chlorine dioxide absorption zone; and venting gases from said upper region of said chlorine dioxide absorption zone.

65. The continuous process of claim 64 wherein: the reaction temperature in said chlorine dioxide synthesis zone ranges from a lower temperature of about 40° C. to an upper temperature of about 90° C.; and wherein the temperature in an upper combined degasifier and gas zone is about 100° C.

66. The continuous process of claim 64 wherein the concentration of hydrochloric acid is about 30% to about 37% by weight.

67. The continuous process of claim 64 wherein the aqueous alkali metal chlorate/alkali metal chloride reaction liquor moves through a high velocity discharge from multi-capillary inlet zones.

68. The continuous process of claim 64 wherein the velocity of said high velocity discharge is about 2 meters/second.

69. The continuous process of claim 64 wherein said hydrochloric acid is fed at a rate of about 3 to about 30 g/L at a temperature of about 2° C.

70. The continuous process of claim 64 wherein said acidic solution of chlorine dioxide contains about 12 to about 14 g/L $ClO_2$ and is a at a temperature of about 3° C.

71. The continuous process of claim 64 including the step of: feeding make-up hydrochloric acid of about 37% by weight to said receiving/stripping zone.

72. The continuous process of claim 64 wherein the chlorine dioxide solution removed from said receiving/stripping zone has a $ClO_2:Cl_2$ ratio greater than about 16.

73. The continuous process of claim 72 wherein chlorine in said solution is reduced to chloride by the addition of an agent selected from the group consisting of hydrogen peroxide, urea, acetic acid, ammonia and methanol at high acidity.

74. The continuous process of claim 64 wherein stripped liquor removed from said receiving/stripping zone contains about 5 to about 8 g/L chlorine dioxide at a temperature of about 25° C.

75. A closed loop system for the production of chlorine dioxide, said system comprising: A) a hydrogen chloride combustion chamber, said hydrogen chloride combustion chamber including separate inlet means for hydrogen, for water, for chlorine, for make-up and for recycled chlorine, and outlet means for hydrochloric acid; B) an electrolytic cell, said electrolytic cell including separate outlet means for hydrogen, said hydrogen outlet means being connected to said inlet means for hydrogen of said hydrogen chloride combustion chamber, for water vapor, said water vapor outlet means being connected to said inlet means for water of said hydrogen chloride combustion chamber, and for alkali metal chlorate solution, and inlet means for recycled alkali metal chlorate solution; and C) a chloride dioxide generator, said chlorine dioxide generator including separate inlet means for feeding hydrochloric acid, said inlet means for feeding hydrochloric acid comprising a plurality of multi-capillary tubes, said tubes are connected to said outlet means for hydrochloric acid from said hydrogen chloride combustion chamber, and for alkali metal chlorate solution, said alkali metal chlorate inlet means are connected to said outlet means for alkali metal chlorate, thereby to provide for intermixing of reagents in said chlorine dioxide generator and outlet means for generator off-gases, said off-gases outlet means are connected to a chlorine dioxide absorber.

76. The closed loop system of claim 75 wherein said electrolytic cell apparatus comprises: an electrolyzer including anodes and cathodes therein and a source of electric current connectable thereto, said electrolyzer is interlinked to a reaction vessel by means of liquor/gas outlet line and recycle liquor inlet line, said reaction vessel including a liquor outlet line for connection to an inlet line leading to a flash water evaporating tank, and for connection of a branch line leading to said chlorine dioxide synthesizer apparatus, and a liquor inlet line from said flash tank, said reaction vessel also including an upper header/degasifier and a gas outlet line from said header/degasifier leading to said hydrogen chloride combustion chamber, said flash water evaporating tank including an upper demister device and an upper water vapour outlet line leading to an absorber, said absorber including a condensate withdrawal line connected to a condensate receiving tank, said condensate receiving tank being connected to a hydrogen chloride scrubber connected to said hydrogen chloride combustion chamber, and a gas withdrawal line leading a gas inlet line of said hydrogen chloride combustion chamber apparatus.

77. The closed loop system of claim 76 wherein said electrolyzer is constructed of glass-fiber-reinforced-plastic with a liner of a fluorocarbon plastic.

78. The closed loop system of claim 76 wherein: said reaction vessel is provided with an internal immersed heat exchanger; and wherein, for said reaction vessel, said header/degasifier and said connecting means are formed of titanium.

79. The closed loop system of claim 75 wherein said hydrogen chloride combustion chamber comprises: a synthesis reactor provided with a pair of vertically-spaced-apart, water-quenching lines, an upper chlorine gas feed line, an inlet header, said inlet header is provided with a hydrogen gas feed line leading from a header/degasifier of said electrolytic cell apparatus, and a source of ignition of said hydrogen gas; an absorber connected to a lower hydrogen chloride gas outlet from said synthesis reactor, said absorber including a lower condensed hydrogen chloride outlet line; and a hydrogen chloride scrubber, said hydrogen chloride scrubber including a lower condensed hydrogen chloride inlet line leading from said absorber, an upper water inlet line whereby water flows downwardly countercurrently to upwardly flowing hydrogen chloride gas, an upper scrubber gas bleed line and a lower outlet line for aqueous hydrochloric acid solution for connection of said scrubber to said chlorine dioxide synthesizer apparatus.

80. The closed loop system of claim 79 wherein said reactor of said hydrogen chloride combustion chamber is constructed of steel lined with a fire-resistant fire brick.

81. The closed loop system of claim 79 wherein said inlet of said hydrogen chloride combustion chamber is in the form of a quartz tube.

82. The closed loop system of claim 79 wherein said source of ignition of said hydrogen chloride combustion chamber is a sparker wire connected to a source of high voltage.

83. The closed loop system of claim 79 wherein said hydrogen chloride scrubber is constructed of glass-fiber-reinforced-plastic lined with fluorocarbon plastic.

84. The closed loop system of claim 79 wherein the connecting lines in said system are formed of a fluorocarbon plastic.

85. The closed loop system of claim 79 wherein said hydrogen chloride combustion chamber includes a fire arrester interposed in said hydrogen feed line to said combustion chamber.

86. The closed loop system of claim 79 wherein said hydrogen chloride combustion chamber includes a pilot gas feed line.

87. The closed loop system of claim 79 including a receiving tank connected to said outlet from said scrubber.

88. The closed loop system of claim 79 wherein said chlorine dioxide generator comprises: a chlorine dioxide synthesizer including a bottom inlet line for aqueous hydrochloric acid, a lower inlet line for aqueous liquor containing alkali metal chlorates and alkali metal chlorides and an intermediate outlet line for spent liquor containing alkali metal chlorates and alkali metal chlorides, a plurality of vertically spaced-apart heat exchangers for controlling the temperature of liquor within said chlorine dioxide synthesizer, an upper gas changer including an integrated cooling/condensing system including a cooling heat exchanger and a gas condensing heat exchanger, said gas condensing heat exchanger including inlet means for chill water and outlet means for gaseous products of reaction; and absorber column connected at its lower portion to said outlet means for gaseous products of reaction from said chlorine dioxide synthesizer, and absorber column including an upper inlet line for chill water, and intermediate inlet line for recycled gas, a bottom outlet line for aqueous liquor containing chlorine dioxide, and top outlet line at an upper portion thereof for discharging gas to be connected to said hydrogen chloride combustion chamber apparatus; and a barometric leg liquid column, said barometric leg liquid column including an upper inlet line for aqueous liquor containing chlorine dioxide which has been withdrawn from said absorber column, an intermediate line for introduction of stripping air, and a top outlet line for stripped air, said top outlet line is connected to said intermediate line of said absorber column and a bottom outlet line for aqueous chlorine dioxide liquor product.

89. The closed loop system of claim 88 including a plurality of multi-capillary tubes for feeding said hydrochloric acid to said chlorine dioxide generator, thereby to provide for intermixing of reagents in said chlorine dioxide generator within a time of about one second.

90. The closed loop system of claim 88 including a gas outlet line from said upper gas chamber of said chlorine dioxide synthesizer.

91. The closed loop system of claim 88 including a demister device in said upper portion of said absorber column.

92. The closed loop system of claim 88 wherein said chlorine dioxide synthesizer is provided with a lower internal submerged heating heat exchanger, an intermediate internal submerged cooling heat exchanger, and an integrated upper cooling/condensing system.

93. The closed loop system of claim 88 wherein components of said chlorine dioxide generator are made of titanium.

94. The closed loop system of claim 88 wherein said chlorine dioxide synthesizer apparatus comprises: a chlorine dioxide synthesizer including a bottom inlet line for aqueous hydrochloric acid, an elevated lower inlet line for aqueous liquor containing alkali metal chlorates and alkali metal chlorides, an intermediate outlet line for spent liquor containing alkali metal chlorates and alkali metal chlorides, a plurality of vertically-spaced-apart, heat exchangers for controlling the temperature of liquor within said chlorine dioxide synthesizer, an upper gas changer including an integrated cooling/condensing system including a cooling heat exchanger, and a gas condensing heat exchanger, said gas condensing heat exchanger including inlet means for chill water and outlet means for gaseous products of reaction; a chlorine gas separating tower, said chlorine gas separating tower including a lower inlet line connected to said outlet means for gaseous products of reaction from said chlorine dioxide synthesizer, an upper inlet means for aqueous hydrochloric acid solvent, a top outlet means at an upper portion thereof for unabsorbed gases, connectable to chlorine gas inlet of said hydrogen chloride combustion chamber, and bottom outlet means for chlorine dioxide dissolved in liquor solution of hydrogen chloride; and a receiver/stripper, said receiver/stripper including an upper inlet line connected to said bottom outlet means for said chlorine gas from said chlorine gas separating tower, and also connected to an inlet line for make-up aqueous hydrogen chloride, and an intermediate inlet line for heated stripping and a bottom outlet line for recycled aqueous hydrogen chloride, said bottom outlet line is connected to a refrigeration/chiller apparatus, said bottom outlet line being connected to said upper inlet line for aqueous hydrogen chloride of said chlorine gas separating tower and also to said bottom inlet line for aqueous hydrogen chloride of said chlorine dioxide synthesizer, an upper outlet line for stripped gases; and a chlorine dioxide absorber, said chlorine dioxide absorber including a lower inlet line connected to said upper chlorine dioxide gas outlet line from said receiver/stripper, an upper inlet line for chill water flowing downwardly countercurrent with upwardly flowing gaseous chlorine dioxide, a top gas vent outlet line, and a bottom aqueous chlorine dioxide product outlet line.

95. The closed loop system of claim 94 including a plurality of multi-capillary tubes for feeding said hydrochloric acid to said chlorine dioxide generator, thereby to provide for intermixing of said hydrochloric acid along with chlorate ions and chloride ions in said chlorine dioxide generator.

96. The closed loop system of claim 94 including a gas outlet line from said upper gas chamber of said chlorine dioxide synthesizer.

97. The closed loop system of claim 94 including a demister device in an upper portion of said chlorine dioxide absorber.

98. The closed loop system of claim 94 wherein said chlorine dioxide synthesizer is provided with a lower internal submerged heating heat exchanger, an intermediate internal submerged cooling heat exchanger, and an integrated upper cooling/condensing system.

99. The closed loop system of claim 94 where components of said chlorine dioxide synthesizer apparatus are made of titanium.

* * * * *

UNITED STATES PATENT AND TRADEMARK OFFICE
CERTIFICATE OF CORRECTION

PATENT NO. : 5,324,497
DATED : June 28, 1994
INVENTOR(S) : G. Oscar Westerlund

It is certified that error appears in the above-indentified patent and that said Letters Patent is hereby corrected as shown below:

On the title page: Item [73]

Assignee: Vulcan Materials Company
Birmingham, Alabama

Signed and Sealed this

Twentieth Day of December, 1994

*Attest:*

BRUCE LEHMAN

*Attesting Officer*     *Commissioner of Patents and Trademarks*